(12) United States Patent
Schmidt et al.

(10) Patent No.: US 11,412,028 B2
(45) Date of Patent: Aug. 9, 2022

(54) ONLINE PLATFORM AND A METHOD FOR FACILITATING SHARING OF DATA BETWEEN USERS

(71) Applicant: Bluepipes, Inc., Sacramento, CA (US)

(72) Inventors: Kyle Schmidt, Sacramento, CA (US); William Clark, Sacramento, CA (US)

(73) Assignee: Bluepipes, Inc., Sacramento, CA (US)

( * ) Notice: Subject to any disclaimer, the term of this patent is extended or adjusted under 35 U.S.C. 154(b) by 0 days.

(21) Appl. No.: 16/271,514

(22) Filed: Feb. 8, 2019

(65) Prior Publication Data

US 2020/0259884 A1    Aug. 13, 2020

(51) Int. Cl.
| | | |
|---|---|---|
| *H04L 29/08* | (2006.01) | |
| *G06Q 10/10* | (2012.01) | |
| *H04L 67/06* | (2022.01) | |
| *H04L 67/1097* | (2022.01) | |
| *H04L 67/306* | (2022.01) | |

(52) U.S. Cl.
CPC ......... *H04L 67/06* (2013.01); *G06Q 10/1053* (2013.01); *H04L 67/1097* (2013.01); *H04L 67/306* (2013.01)

(58) Field of Classification Search
CPC ... H04L 67/06; H04L 67/1097; H04L 67/306; G06Q 10/1053
USPC ....................................................... 709/205
See application file for complete search history.

(56) References Cited

U.S. PATENT DOCUMENTS

| | | | |
|---|---|---|---|
| 9,178,753 B2 | 11/2015 | Micucci et al. | |
| 9,971,993 B2 | 5/2018 | Cheng et al. | |
| 10,296,872 B1 * | 5/2019 | Obeid | G06F 16/9535 |
| 2005/0080656 A1 * | 4/2005 | Crow | G06Q 10/10 |
| | | | 705/7.14 |
| 2008/0071746 A1 | 3/2008 | Concordia et al. | |
| 2011/0276507 A1 | 11/2011 | O'Malley | |
| 2012/0041889 A1 | 2/2012 | Morrison et al. | |

(Continued)

FOREIGN PATENT DOCUMENTS

| | | |
|---|---|---|
| IN | 2014MU01973 A | 8/2014 |
| WO | WO 2014/028340 A1 | 2/2014 |

OTHER PUBLICATIONS

International Search Report and Written Opinion dated May 11, 2020 cited in Application No. PCT/US20/16517, 10 pgs.

(Continued)

*Primary Examiner* — Schquita D Goodwin
(74) *Attorney, Agent, or Firm* — Bekiares Eliezer LLP

(57) ABSTRACT

Disclosed is an online platform for facilitating sharing of data between users. The online platform comprising a communication device, a processing device and a storage device. The communication device configured for transmitting a first account indicator associated with a first user account, receiving a first account selection, receiving a second user profile data associated with a second user account, transmitting the second user profile data, and receiving a modified second user profile data. The processing device is configured for creating an account connection between the first user account and the second user account, associating a copy of the second user profile data with the first user account. The storage device is configured for storing the account connection, storing the copy of the second user profile data and storing the modified second user profile data in association with the first user account.

20 Claims, 21 Drawing Sheets

(56) References Cited

U.S. PATENT DOCUMENTS

| | | | |
|---|---|---|---|
| 2012/0296978 A1* | 11/2012 | Inoue | G06Q 10/10 |
| | | | 709/204 |
| 2013/0110735 A1* | 5/2013 | Lappin | G06Q 10/1053 |
| | | | 705/321 |
| 2013/0282605 A1* | 10/2013 | Noelting | G06Q 10/10 |
| | | | 705/321 |
| 2014/0250024 A1* | 9/2014 | Takalpati | G06Q 10/1053 |
| | | | 705/321 |
| 2015/0186846 A1* | 7/2015 | Menon | G06Q 10/1053 |
| | | | 705/321 |
| 2015/0213413 A1* | 7/2015 | Faron | G06Q 10/1053 |
| | | | 705/321 |
| 2015/0235179 A1 | 8/2015 | Schmidt et al. | |
| 2016/0005001 A1* | 1/2016 | Muhammedali | H04L 67/306 |
| | | | 705/319 |
| 2016/0098685 A1* | 4/2016 | Hanigan | G06Q 10/1053 |
| | | | 705/321 |
| 2017/0255708 A1 | 9/2017 | Cho et al. | |
| 2017/0270485 A1* | 9/2017 | Meier | G06Q 10/06398 |
| 2018/0276618 A1* | 9/2018 | Nichani | G06Q 10/1053 |
| 2019/0019160 A1* | 1/2019 | Champaneria | G06F 40/30 |
| 2019/0138999 A1* | 5/2019 | Dangi | G10L 17/00 |
| 2020/0065769 A1* | 2/2020 | Gupta | G06Q 10/1053 |
| 2020/0233910 A1* | 7/2020 | Bhide | G06F 40/205 |

OTHER PUBLICATIONS

International Preliminary Report on Patentability dated Aug. 19, 2021 cited in Application No. PCT/US20/16517, 9 pgs.

* cited by examiner

FIG. 8

ONLINE PLATFORM AND A METHOD FOR FACILITATING SHARING OF DATA BETWEEN USERS

FIELD OF DISCLOSURE

The present disclosure generally relates to collaborative data management. The present disclosure specifically relates to collaboration and tracking of user profiles.

BACKGROUND

Currently, the vast majority of employers manage job-applicants in one of the following two ways. First, many employers utilize "applicant tracking systems". Essentially, applicant tracking systems are software services that automate much of the talent acquisition process including but not limited to job advertisements, job applications, interviews, scheduling and marketing.

Second, many employers accept electronic copies of resumes for job consideration. This could be accomplished via a "Quick Apply" feature on services like Indeed™, ZipRecruiter™ and LinkedIn™. In this case, the job-candidate uploads an electronic copy of their resume, in a format like Word or PDF, to a form provided during the job application process that, when submitted, transmits the document to the employer. Additionally, some employers may accept these resumes via email or via an upload option right on their own website.

Employers utilize applicant tracking systems and/or accept electronic resumes for employment consideration based on available resources (money) and/or preference. Some estimates indicate that 75%-90% of large businesses and 60% of medium-sized businesses utilize applicant tracking systems.

While both methods are a major improvement over paper resumes and paper job applications, certain aspects are far less efficient and organized than they could be. Additionally, both methods lack certain aspects altogether that would be highly beneficial to both job-applicants and employers.

We must first provide background on the current "application-process" and "application-update-process" in order to illustrate how the invention improves the efficiency and organization of the "application-update-process". The "application-process" is the process whereby a job-candidate initially applies for a job with an employer. The "application-update-process" is the process whereby a job-candidate updates their already existing job application with an employer.

The application-process varies based on how the employer manages job-applicants. If the employer uses an applicant tracking system, then they most commonly use one of three methods or a combination thereof. First, the job-candidate may be required to complete the entire application process via the employer's applicant tracking system. This typically involves the creation of an account, with username and password, and the completion of required online application forms. This creates a record for the candidate in the applicant tracking system which allows the employer to make use of the system's features.

Second, the employer's applicant tracking system might use "resume parsing" software. Again, this typically involves the creation of an account with username and password. Resume parsing software is configured to extract data from an uploaded resume document, a Microsoft Word or PDF document for example, and insert the data into pertinent data fields in the applicant tracking system's job application. Essentially, resume parsing software populates the employer's electronic job application using data collected from the candidate's resume so the candidate doesn't have to manually enter the data on their own. Again, this creates a record for the candidate in the applicant tracking system which allows the employer to make use of the system's features.

Third, the employer's applicant tracking system might be configured to accept job-applicant data from Application Programming Interfaces (APIs) provided by third party career platforms like Indeed™. In this scenario, job-applicants create career profiles on third party career platforms where employers post their job openings. When a job-applicant applies for a job on the third party platform, the third party platform transmits the data from the job-applicant's career profile to an endpoint on the employer's applicant tracking software which is configured to insert the data into pertinent data fields for the applicant tracking system's job application.

Alternatively, as described above, many employers operate without an applicant tracking system. In most cases, these employers accept electronic copies of resumes to handle their job-application process.

In all use cases described above, the application-update-process is unorganized and inefficient. In the case of applicant tracking systems, candidates must log in to each system in order to update their application. In the case of electronic resumes, the candidate must somehow transmit an updated resume to the employer and the employer must somehow match the new and previously existing record if one even exists.

The result is that these updates rarely occur. Therefore, employers lose contact with candidates who have previously expressed an interest in working with them. In the industry, this problem is commonly referred to as "stale leads".

BRIEF OVERVIEW

An online platform and a method for facilitating sharing of data between users may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure relate to methods and systems (collectively referred to as the "platform") of facilitating sharing of data between users. For instance, the sharing of data may be performed between a first user device (e.g., a an employer device or a recruiter device) and a second user device (e.g., a candidate device). Accordingly, the first user device may be associated with a first user account (e.g., an employer account or recruiter account) and the second user device may be associated with a second user account (e.g., a candidate account). Communication between the devices may be, in some embodiments, facilitated between an intermediary device (i.e., a server computer or cloud computing environment, which may be terms used interchangeably throughout the present disclosure). The features and functionality associated with an employer or recruiter, and any device, account, or data associated there may be referred to interchangeably, or designated as the "receiving party," throughout the present disclosure.

In an instance, a candidate may be presented with an employer indicator associated with the receiving party account. For example, the receiving party indicator may include data representing a name of the receiving party and/or a logo of the receiving party. Further, the receiving party indicator may be presented (e.g. visually, aurally, tactically or through any other sensory modalities) to the candidate through a digital content such as, but not limited to, a job posting, a candidate profile page, and a company profile page. In other words, when the candidate is viewing the job posting on the candidate device (e.g. a smartphone), the receiving party indicator, including the name of the receiving party and/or the logo may be displayed on the candidate device.

Accordingly, in order to present the receiving party indicator to the candidate, the platform may be configured to transmit, using a communication device, the first account indicator associated with the first user account to the second user device associated with the second user account of the second user. More specifically, in an instance, the platform may be configured to transmit the receiving party indicator to the candidate device. As a result, the candidate may become aware of the existence of and/or a nature of the receiving party.

Further, the candidate may be interested in the receiving party and may wish to share candidate data (e.g. a resume of the candidate) with the receiving party. Accordingly, the candidate may perform an input operation associated with the receiving party indicator in order to express an interest in the receiving party. For example, the receiving party indicator may be displayed on the candidate device in the form of an interactive GUI element. Accordingly, the candidate may perform a selection operation (e.g., a touch) on the interactive GUI element to indicate the interest. The selection operation may constitute a first account selection performed by the candidate. Further, the candidate device may be configured to transmit the first account selection to a server computer. Accordingly, the platform may be configured to perform a step of receiving, using the communication device, the first account selection from the second user device (i.e., the candidate device).

Further, the interest expressed by the candidate may be used to create an account connection between the candidate account and the receiving party account for the purpose of sharing data. Accordingly, the platform may be configured to create, using a processing device, the account connection between the first user account and the second user account based on the first account selection. The account connection may include data representing each of the candidate account and the receiving party account. Further, the account connection may be persisted in a storage device in the server computer. Accordingly, the platform may be configured to store, using the storage device, the account connection.

Further, once the candidate expresses the interest in sharing candidate data with the receiving party, the candidate data (e.g., a resume) may be retrieved and transmitted. Accordingly, the platform may be configured to receive, using the communication device, a second user profile data (e.g., the candidate data) associated with the second user account based on the account connection. More specifically, the platform may communicate the candidate data from the candidate device and/or a third party server.

As a result, the platform may possess a copy of the second user profile data in the storage device. In some embodiments, the storage device may optionally include a copy of the candidate data. Further, the copy of the candidate data may be linked with the receiving party account associated with the receiving party. Accordingly, the platform may be configured to associate, using the processing device, the stored second user profile data with the first user account.

Such an association indicates that the copy of the second user profile data (i.e. the candidate data) is linked to the first user (e.g. the receiving party) and therefore represents a customizable version of the candidate data that may be tailored to one or more preferences of the receiving party.

Further, the candidate data may be presented to the receiving party. In other words, the candidate data may be presented (e.g. visually, aurally, tactically or through any other sensory modalities) on the receiving party device operated by the receiving party. Accordingly, the method may include a step of transmitting, using the communication device, the second user profile data to the first user device. More specifically, the server computer may transmit the candidate data to the receiving party device. Accordingly, the receiving party device may be configured for receiving the candidate data from, for example, a server computer and presenting (e.g. displaying) the candidate data to the receiving party. As a result, the receiving party may become aware of the candidate data.

Further, the receiving party may modify one or more portions of the candidate data. For example, the candidate may perform a modifying operation on one or more of a form and a content of the candidate data. Further, the modifying operation may be performed by the receiving party using the receiving party device. Further, the modifying operation may be based on the one or more preferences of the receiving party. For instance, the receiving party may remove certain portions of the candidate data that are not relevant to the receiving party. As another instance, the receiving party may summarize the candidate data in order to aid quick comprehension. As another instance, the receiving party may add certain annotations (e.g. comments) to the candidate data that may aid in management of the candidate data by the receiving party. As yet another instance, the receiving party may modify the language of candidate data, without substantially altering the semantic content of the candidate data, in order to render the candidate data in a standard vocabulary.

As a result of performing the modifying operation, a modified second user profile may be generated. In some embodiments, the stored second user profile may be modified. In further embodiments, a modified candidate data may be generated based on the modifying operation.

Subsequent to performing the modifying operation, the receiving party device may be configured for transmitting a modified second user profile data to, for example, a server computer. The modified second user profile data may include, in an instance, the modified candidate data. In other words, the receiving party device may be configured for generating the modified candidate data based on the modifying operation and subsequently transmit the modified candidate data. In another instance, the modified second user profile data may include indication of the modifying operation. Accordingly, the receiving party device may transmit the indication of the modifying operation to the server computer. Subsequently, the server computer may generate the modified candidate data based on the modifying operation.

Accordingly, the platform may be configured to receive, using the communication device, the modified second user profile data from the first user device. More specifically, the modified candidate data may be received from the receiving party device. Further, the platform may be configured to store, using the storage device, the modified second user profile data in association with the first user account. In other words, the modified candidate data may be linked to the receiving party account in order to indicate that the modified candidate data represents a customized version of the candidate data tailored to one or more preferences of the receiving party. As a result, at a later time, when the receiving party wishes the view the modified second user profile data, based on a request received from the receiving party device, the modified candidate data may be retrieved and transmitted to the receiving party device for presenting the candidate data to the receiving party.

The online platform comprising a communication device, a processing device communicatively coupled with the communication device, and a storage device communicatively coupled with the processing device is provided. The communication device may be configured for transmitting a first account indicator associated with a first user account to a second user device associated with a second user account of a second user of at least one second user. Further, the communication device may be configured for receiving the first account selection from the second user device. Further, the communication device may be configured for receiving a second user profile data associated with the second user account based on an account connection. Yet further, the communication device may be configured for transmitting the second user profile data to the first user device. Moreover, the communication device may be configured for receiving a modified second user profile data from the first user device. Further, the processing device may be configured for creating the account connection between the first user account and the second user account based on the first account selection. Yet further, the processing device may be configured for associating a copy of the second user profile data with the first user account. Further, the storage device may be configured for storing the account connection. Yet further, the storage device may be configured for storing the copy of the second user profile data. Moreover, the storage device may be configured for storing the modified second user profile data in association with the first user account.

According to some embodiments, a method of facilitating sharing of data between users is disclosed. The method may include transmitting, using a communication device, a first account indicator associated with a first user account to a second user device associated with a second user account of a second user of at least one second user. Further, the method may include receiving, using the communication device, the first account selection from the second user device. Further, the method may include receiving, using the communication device, a second user profile data associated with the second user account based on an account connection. Further, the method may include transmitting, using the communication device, the second user profile data to the first user device. Further, the method may include receiving, using the communication device, a modified second user profile data from the first user device. Further, the method may include creating, using a processing device, the account connection between the first user account and the second user account based on the first account selection. Further, the method may include associating, using the processing device, a copy of the second user profile data with the first user account. Further, the method may include storing, using a storage device, the account connection. Further, the method may include storing, using the storage device, the copy of the second user profile data. Further, the method may include storing, using the storage device, the modified second user profile data in association with the first user account.

According to some embodiments, a method of facilitating sharing of data between users is disclosed. The method may include transmitting, using a communication device, a first account indicator associated with a first user account to a second user device associated with a second user account of a second user of at least one second user. Further, the method may include receiving, using the communication device, the first account selection from the second user device. Further, the method may include creating, using a processing device, an account connection between the first user account and the second user account based on the first account selection. Further, the method may include storing, using a storage device, the account connection. Further, the method may include receiving, using the communication device, a second user profile data associated with the second user account based on the account connection. Further, the method may include transmitting, using the communication device, the second user profile data to the first user device. Further, the method may include receiving, using the communication device, an acceptance selection from the first user device, wherein the acceptance selection represents acceptance of the first user to accept the second user profile data to be associated with the first user account. Further, the method may include associating, using the processing device, a copy of the second user profile data with the first user account. Further, the method may include storing, using the storage device, the copy of the second user profile data. Further, the method may include receiving, using the communication device, an updated second user profile data from the second user device. Further, the method may include transmitting, using the communication device, an update notification to the first user device, wherein the update notification comprises the updated second user profile data. Further, the method may include receiving, using the communication device, an update acceptance selection from the first user device, wherein the update acceptance selection represents acceptance of the first user to accept the updated second user profile data to be associated with the first user account. Further, the method may include storing, using the storage device, the updated second user profile data based on the update acceptance selection. Further, the method may include receiving, using the communication device, a modified second user profile data from the first user device. Further, the method may include transmitting, using the communication device, a modification notification comprising the modified second user profile data to the second user device, wherein the second presentation device is configured for presenting the modification notification to the second user. Further, the method may include receiving, using the communication device, a modification acceptance selection from the second user device corresponding to the modification notification, wherein the second input device is configured for receiving the modification acceptance selection from the second user. Further, the method may include storing, using the storage device, the modified second user profile data in association with the first user account based on the modification acceptance selection.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 8 is a snapshot of the software application showing a candidate updating the candidate profile, in accordance with an exemplary embodiment;

DETAILED DESCRIPTION

Figure 1A:
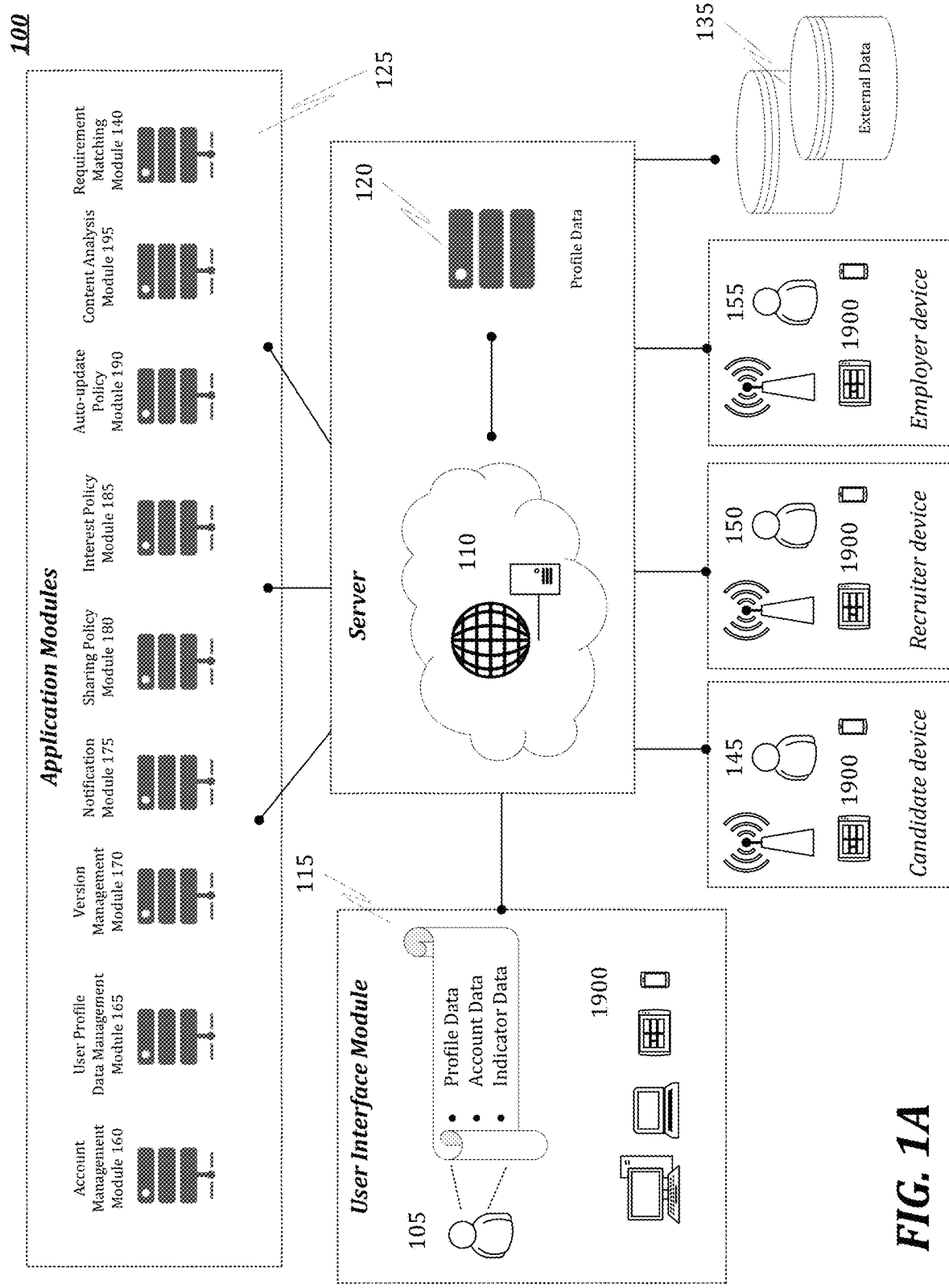
FIG. 1A illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

I. Platform Overview

Consistent with embodiments of the present disclosure, an online platform for facilitating sharing of data between users may be provided. The platform addresses the inefficiencies created by the conventional methods and systems, including, for example, the problem of greater frictional unemployment. If employers received regular application-updates from previous job-applicants, then they would be equipped to make hiring decisions and extend job offers much more quickly. Job-candidates who were previously unqualified, but now qualified, could be easily identified while they were still passive candidates and extended job offers from employers. This in turn would free up lower level positions quicker for less seasoned members of the labor force.

Next, the conventional methods and systems altogether lack a process whereby job-applicants can collaborate with employers on their career profile or job application. Unbeknownst to most job-applicants, the employers' recruitment representatives often modify job-application and resume data to make improvements prior to forwarding the job-application to employers' hiring managers.

Job-applicants could benefit greatly if they had access to reviewing these modifications and were given the option to incorporate them into their own record of their career profile. Ultimately, job-applicants would be better able to articulate their skill sets in ways that were more appealing to potential employers thereby increasing their likelihood of getting hired. Accordingly, the online platform of the present disclosure may facilitate the sharing of data between candidates, employers, and recruiters, to efficiently search/apply for jobs and select candidates matching job requirements. While many aspects and features relate to, and are described in, the context of sharing of data between candidates, employers, and recruiters, embodiments of the present disclosure are not limited to use only in this context. Rather, the underlying methods and systems may be used in the context of data sharing un general.

According to some embodiments, a method and a system that allows employers to agree to accept career-related data and documentation from candidates is disclosed. The disclosed method and system allows candidates to agree to share career-related details and documentation with the employers by providing candidates with a career profile designed to store career related details and documentation which can be connected with employer profiles designed to accept, store, modify and share candidate career related details and documentation such that the candidate's updates to their career profile are automatically shared with all connected employer profiles as long as the candidate maintains a connection to a specified employer profile.

According to some embodiments, a professional networking platform that enables users to enter, store and share data is disclosed. Current "social media" platforms operate in one of two ways. First, platforms allow users create profiles and give users the option to "Follow" other users. When a user Follows another user, the Followed user's content is pushed to the Follower. Second, current platforms allow users to create profiles and "Connect" with one another. In this scenario, one user submits a request to Connect and another user accepts or rejects that request. If two users are connected, then both users will have their content pushed to the other user.

The disclosed platform allows users to create profiles and agree to have content pushed to them from other users. Other users can then connect their profile with the users who have agreed to receive content pushed to them by other users. This connection does not require any further acceptance. Once connected, the disclosed platform will push content from the connector to the connected as long as the connection is in place.

Further, the individuals sign up with the platform as a user of a particular type. The user type may include, for example, but not be limited to, a candidate, an employer, or a recruiter. Further, the candidates (referred to herein, at times, as a 'prospective employee' or just 'employee') are granted access to a career profile that helps them recognize and store all the details and documents employers need to make a hiring decision. Further, the employers are granted access to a career profile that allows them to also create and administer/join a company profile. Yet further, the employers must join a Company Profile in order to gain access to some features of the platform. Through their Company Profile, the employers are given the option to agree to receive data and documents from candidates.

Further, if an employer agrees to receive data and documents from candidates, then the employer is granted access to a "Feed" or a "Pseudo Applicant Tracking System" which is essentially a User Interface for managing the shared data and documents of connected candidates. Further, if an employer agrees to receive data and documents from candidates, then a "Connect Profile" option is added to all instances of the employer on the platform. This includes Job Advertisements, Individual User Profiles, Company Profiles, etc. Thereafter, the candidates can then select the "Connect Profile" option and agree to transmit a copy of all their current data and documentation stored in their career profile as well as automatically transmit to the company all future modifications and additions to their career profile. Upon completing the "Connect Profile" process, a carbon copy of all the candidate's data and documents is made and stored in databases for use by the Employer. Note, these data and documents are separate and distinct from the candidate's data and documents. There are now two separate and distinct sets of data and documents.

Further, the employer is able to access their version of this candidate's record via the "Feed" (user interface) described above. Each connected candidate has their own separate and distinct record within the employer's Feed. The employer can modify and add to these records without affecting the candidate's own record.

Further, upon completing the "Connect Profile" process, the platform establishes a connection between the candidate and the company. With the profile connected, each time the candidate makes an update to their profile, the employer receives the update. This happens in one of two ways. In some cases, the update is automatically added to the employer's record. For example, when a candidate uploads a copy of their new Driver's License, it's automatically added to the employer's record. In other cases, the candidate updates are diverted to an "Update Manager". The "Update Manager" is a user interface that displays the update, compares it to the employer's record of the corresponding item and allows the employer to accept or reject the update.

Furthermore, in embodiments with the profile connected, the employer may be provided with the option to request updates on various items in the candidate's profile. By way of non-limiting example, if a document has an expiration date, then the employer can request an update for the specified document. Doing so sends a notification to the candidate with a request to update the specified item.

Further still, the candidates can manage their employer connections via a page (user interface) that lists all employer connections. A "Remove" option is provided for each listed company. If the Remove option is selected, then the connection is removed and all future updates are not transmitted to the corresponding employer. If a Candidate removes a connection, they are provided with the opportunity to reconnect.

Details with regards to each module are provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage disclosed within each module can be considered independently without the context of the other stages within the same module or different modules. Each stage may contain language defined in other portions of this specification. Each stage disclosed for one module may be mixed with the operational stages of another module. In the present disclosure, each stage can be claimed on its own and/or interchangeably with other stages of other modules.

The following depicts an example of a method of a plurality of methods that may be performed by at least one of the aforementioned modules. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, server ^10 and/or computing device *00 may be employed in the performance of some or all of the stages disclosed with regard to the methods. Similarly, apparatus ^05 may be employed in the performance of some or all of the stages of the methods. As such, apparatus ^05 may comprise at least those architectural components as found in computing device *00.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the aforementioned modules. The method may be embodied as, for example, but not limited to, computer instructions, which when executed, perform a method of facilitating sharing of data between users. The method may include transmitting, using a communication device, a first account indicator associated with a first user account to a second user device associated with a second user account of a second user of at least one second user. Further, the method may include receiving, using the communication device, the first account selection from the second user device. Yet further, the method may include creating, using a processing device, an account connection between the first user account and the second user account based on the first account selection. Moreover, the method may include storing, using a storage device, the account connection.

Further, the method may include receiving, using the communication device, a second user profile data associated with the second user account based on the account connection. Further, the method may include transmitting, using the communication device, the second user profile data to the first user device. Further, the method may include receiving, using the communication device, an acceptance selection from the first user device, wherein the acceptance selection represents acceptance of the first user to accept the second user profile data to be associated with the first user account. Yet further, the method may include associating, using the processing device, a copy of the second user profile data with the first user account. Moreover, the method may include storing, using the storage device, the copy of the second user profile data.

Further, the method may include receiving, using the communication device, an updated second user profile data from the second user device. Further, the method may include transmitting, using the communication device, an update notification to the first user device, wherein the update notification comprises the updated second user profile data. Further, the method may include receiving, using the communication device, an update acceptance selection from the first user device, wherein the update acceptance selection represents acceptance of the first user to accept the updated second user profile data to be associated with the first user account. Yet further, the method may include storing, using the storage device, the updated second user profile data based on the update acceptance selection. Moreover, the method may include receiving, using the communication device, a modified second user profile data from the first user device.

Further, the method may include transmitting, using the communication device, a modification notification comprising the modified second user profile data to the second user device, wherein the second presentation device is configured for presenting the modification notification to the second user. Yet further, the method may include receiving, using the communication device, a modification acceptance selection from the second user device corresponding to the modification notification, wherein the second input device is configured for receiving the modification acceptance selection from the second user. Moreover, the method may include storing, using the storage device, the modified second user profile data in association with the first user account based on the modification acceptance selection.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1A illustrates one possible operating environment through which a platform 100 consistent with embodiments of the present disclosure may be provided. By way of non-limiting example, the platform 100 may be hosted on a centralized server 110, such as, for example, a cloud computing service. A user 105 may access platform 100 through a software application. The software application may be embodied as, for example, but not be limited to, a website, a web application, a desktop application, and a mobile application compatible with a computing device 1900. One possible embodiment of the software application may be provided by the BluePipes™ suite of products and services provided by Bluepipes, Inc. FIGS. 2-10 are snapshots of the software application in accordance with an exemplary embodiment of the present disclosure.

Still consistent with embodiments of the present disclosure, platform 100 may comprise an application programming interface (an "API"). The API may provide controls and commands to operate platform 100. The controls and commands may correspond to the various functions, features, methods, and systems disclosed herein, in their various embodiments. In yet further embodiments, the API may make the second user's data (e.g., a candidate profile) available for another software system (e.g., a third party platform) to access the data in order to make use of the data. By way of non-limiting example, the API may enable access to JSON files containing the data which a third party platform (e.g., an employer's applicant tracking system) can access, download, modify, etc. In yet further embodiments, platform 100 may provide endpoints for external systems to communicate with platform 100 such that collaboration can take place.

The centralized server 110 may be connected to external databases 135 corresponding to known social media platforms. Further, the centralized server 110 may be configured to receive and transmit profile data 120.

Further, users of the platform 100 may include relevant parties such as, but not limited to, candidates 145, recruiters 150, employers 155, administrators and so on. Accordingly, in some instances, electronic devices operated by the one or more relevant parties may be in communication with the platform 100.

As will be detailed with reference to FIG. 19 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

Figure 1B:
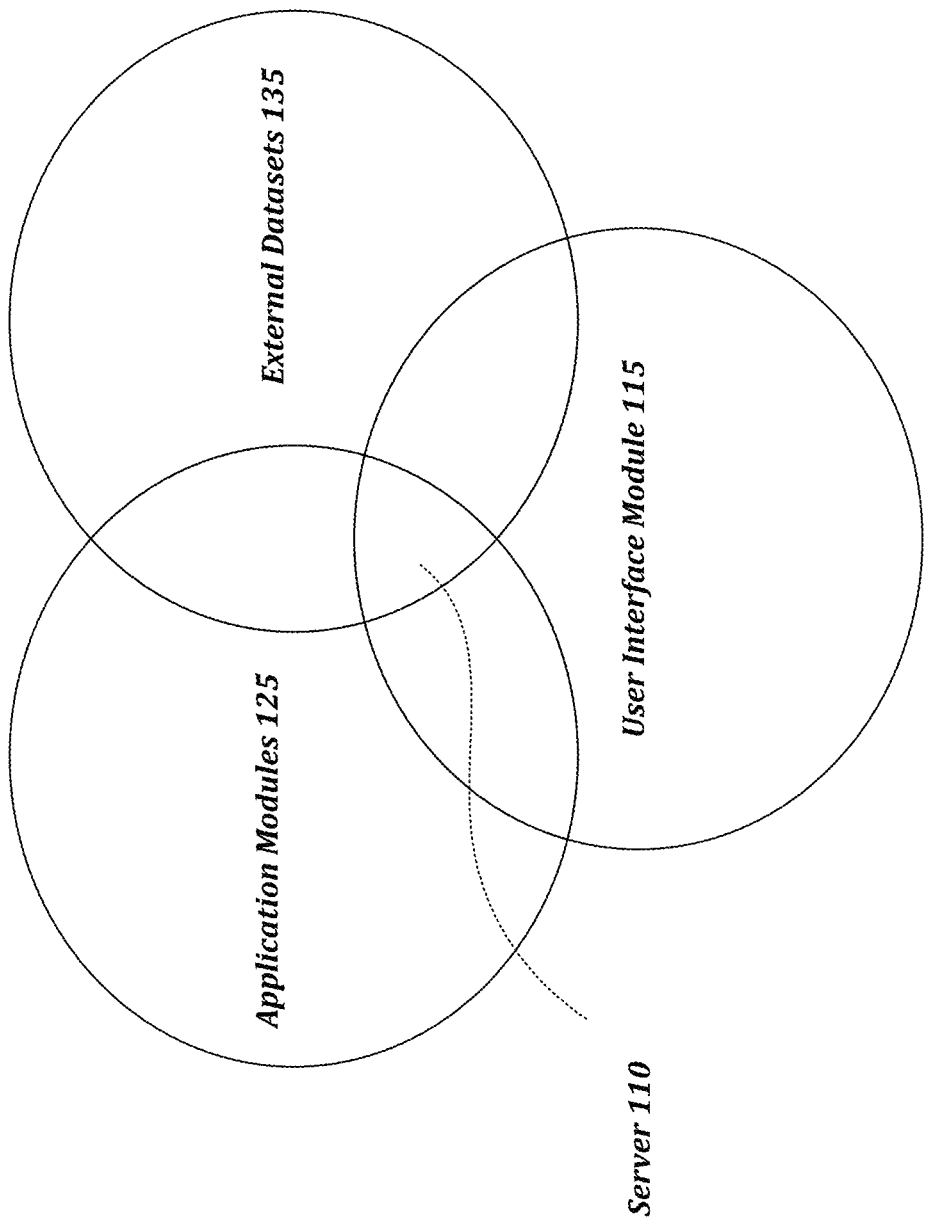
FIG. 1B illustrates various modules of an operating environment consistent with the present disclosure.

FIGS. 1A and 1B illustrate non-limiting examples of operating environments for application modules 125 comprising one or more of a user interface module 115, an account management module 160, a user profile data management module 165, a version management module 170, a notification module 175, a sharing policy module 180, an interest policy module 185, an auto-update policy module 190, a content analysis module 195 and a requirement matching module 140.

The aforementioned modules and functions and operations associated therewith may be operated by a computing device. In some embodiments, each module may be performed by separate, networked computing devices; while in other embodiments, certain modules may be performed by the same computing device.

I. Accordingly, embodiments of the present disclosure provide a software and hardware platform comprised of a distributed set of computing elements, including, but not limited to: a user interface module 115, an account management module 160, a user profile data management module 165, a version management module 170, a notification module 175, a sharing policy module 180, an interest policy module 185, an auto-update policy module 190, a content analysis module 195 and a requirement matching module 140.

II. Embodiments of the present disclosure provide a hardware and software platform operative as a distributed system of the aforementioned modules and computing elements of a computing device. The computing device may include one or more of a communicating device, a processing device, and a storage device. The processing device may be communicatively coupled with the communication device. Further, the storage device communicatively coupled with the processing device.

A. User Interface Module 115

The user interface module 115 may be operative to receive, via the communication device, an interest indicator from a first user device associated with a first user account of a first user. Further, the first user device may include a first input device configured for receiving the interest indicator from the first user. In some embodiments, the first user device may correspond to an employer device. Accordingly, the first user may include an employer of a company.

Further, the interest indicator may include a consent indicator representing consent of the first user to receive digital content associated with at least one second user. In some embodiments, the second user may include at least one of a candidate and an employee. Accordingly, a second user device may be a candidate device.

Further, the user interface module 115 may be operative to transmit, via the communication device, a first account indicator associated with the first user account to a second user device associated with a second user account of a second user of the at least one second user. Further, the first account indicator may be comprised in one or more of a job posting, an employer profile page, and a recruiter profile page. Further, the second user device may include a second presentation device configured for presenting the first account indicator. Further, the second user device further may include a second input device configured for receiving a first account selection associated with the first account indicator from the second user.

In some embodiments, the first account indicator may include a first user profile data. For example, the first account indicator may include a company name and a company description. Accordingly, the second user, such as a candidate, may view the first account indicator and determine a relevance of the first user account (e.g. employer account) to the second user account (e.g. a candidate account). Subsequently, the second user may express an interest in sharing digital content associated with the second user to the first user. Accordingly, the second user may provide the first account selection expressing the interest.

Further, the user interface module 115 may be operative to receive, via the communication device, the first account selection from the second user device.

Further, the user interface module 115 may be operative to receive, via the communication device, an acceptance selection from the first user device. Further, the acceptance selection represents acceptance of the first user to accept the second user profile data to be associated with the first user account. Accordingly, in some embodiments, the second user profile data such as the candidate data may be associated and stored with the first user account, such as the employer account. Further, the first input device may be configured for receiving the acceptance selection from the first user. Further, the second user profile data may include a candidate profile data including one or more of personal profile data, social profile data, educational profile data and work profile data associated with the candidate.

Further, the user interface module 115 may be operative to receive, via the communication device, an update acceptance selection from the first user device. Further, the update acceptance selection represents acceptance of the first user to accept the updated second user profile data to be associated with the first user account.

B. User Profile Data Management Module 165

The user profile data management module 165 may be operative to receive, via the communication device, a second user profile data associated with the second user account based on an account connection. In some embodiments, the user profile data management module 165 may receive the second user profile data (e.g. candidate profile data) from at least one of the storage device of the online platform 100, the second user device and a third party server associated with the second user account.

Further, the user profile data management module 165 may be operative to transmit, via the communication device, the second user profile data to the first user device. Further, the first presentation device may be configured for presenting the second user profile data to the first user.

Further, the user profile data management module 165 may be operative to receive, via the communication device, an updated second user profile data from the second user device. Further, the second input device may be configured for receiving an updation input corresponding to the second user profile data. Further, the second user device may include a second processor configured for generating the updated second user profile data based on the updation input.

Further, the user profile data management module 165 may be operative to receive, via the communication device, a modified second user profile data from the first user device. Further, the second input device may be configured for receiving a modification input corresponding to the second user profile data from the first user. Further, the first user device further may include a first processor configured for generating the modified second user profile data based on the modification input.

Further, the user profile data management module 165 may be operative to store, via the storage device, the copy of the second user profile data based on the acceptance selection. Further, the user profile data management module 165 may be operative to store, via the storage device, the updated second user profile data based on the update acceptance selection. Further, the user profile data management module 165 may be operative to store, via the storage device, the modified second user profile data in association with the first user account. Further, the version management module 170 may be operative to manage, via the processing device, multiple versions of the second user profile data.

Further, the user profile data management module 165 may be operative to transmit, via the communication device, the second user profile data to the first user device based on the analyzing.

Further, the user profile data management module 165 may be operative to transmit the second user profile data which may further include transmitting the at least one shareable data item.

Further, the user profile data management module 165 may be operative to transmit, via the communication device, the second user profile data including transmitting the relevant data item.

Further, the user profile data management module 165 may be operative to analyze, via the processing device, the updated second user profile data in relation to the auto-update policy.

Further, the user profile data management module 165 may be operative to automatically associate, via the processing device, the updated second user profile data with the first user account based on the analyzing of the updated second user profile data.

Further, the user profile data management module 165 may be operative to analyze, via the processing device, the updated second user profile data and the second user profile data.

C. Notification Module 175

The notification module 175 may be operative to transmit, via the communication device, an update notification to the first user device. Further, the update notification may include the updated second user profile data. Further, the first presentation device may be configured for presenting the update notification to the first user.

Further, the notification module 175 may be operative to generate, via the processing device, an update handler based on the analyzing. Further, the update notification may include, but not be limited to, an update summary. In some embodiments, the update summary may include a previous version of a data item and a corresponding updated version of the data item side by side in order to facilitate the first user to make a decision of whether or not to accept the updated second user profile data.

Further, the notification module 175 may be operative to transmit, via the communication device, a modification notification including the modified second user profile data to the second user device. Further, the second presentation device may be configured for presenting the modification notification to the second user.

Further, the notification module 175 may be operative to receive, via the communication device, a modification acceptance selection from the second user device corresponding to the modification notification. Further, the second input device may be configured for receiving the modification acceptance selection from the second user. Further, the storage device may be configured for storing the modified second user profile data in association with the first user account based on the modification acceptance selection. Therefore, the candidate may be shown the modifications made to the candidate profile by the employer. Accordingly, the candidate may either accept or reject the modifications made by the employer to the candidate profile.

D. Account Management Module 160

The account management module 160 may be operative to create, via the processing device, the account connection between the first user account and the second user account based on the first account selection. Further, the account management module 160 may be operative to associate, via the processing device, a copy of the second user profile data with the first user account.

Further, the account management module 160 may be operative to store, via the storage device, the account connection.

E. Sharing Policy Module 180

The sharing policy module 180 may be operative to receive, via the communication device, a sharing policy data from the second user device. Further, the second input device may be configured for receiving the sharing policy data from the second user. Further, at least one of the sharing policy module 180 and the content analysis module 195 may be operative to analyze, via the processing device, each of the sharing policy data and the second user profile data. Further, the user profile data management module 165 may be operative to transmit, via the communication device, the second user profile data to the first user device based on the analyzing.

In some embodiments, the sharing policy may specify (e.g. in natural language and/or a platform-specific vocabulary) what is deemed to be objectionable content. Accordingly, the platform 100 may analyze the candidate profile data and redact the objectionable content therefrom.

In some embodiments, the sharing policy data may include at least one permission indicator associated with at least one data item. Further, the content analysis module 195 may be operative to determine, via the processing device, one or more of at least one shareable data item and at least one non-shareable data item based on the at least one permission indicator. Further, the second user profile data may include a plurality of data items including the at least one shareable data item and the at least one non-shareable data item. Further, the user profile data management module 165 may be operative to transmit the second user profile data which may further include transmitting the at least one shareable data item.

In some embodiments, the sharing policy data may include a plurality of target characteristics corresponding to a plurality of second user accounts. For example, in some embodiments, the second user such as a candidate, may specify a list of different kinds of companies and a corresponding indication of shareable data item and non-shareable data item. Accordingly, in an instance, only work profile data (e.g. work experience) which may be relevant to a particular company with which the candidate is sharing the user profile data is transmitted to the company account.

Further, each target characteristic may be associated with one or more of a shareable data item indicator and a non-shareable data item indicator. Further, the content analysis module 195 may be operative to determine, via the processing device, a target characteristic of the second user account based on analysis of a second user profile data corresponding to the second user account. Further, the content analysis module 195 may be operative to determine, via the processing device, a shareable data item of the at least one shareable data item based on the target characteristic and one or more of the shareable data item indicator and the non-shareable data item indicator corresponding to the target characteristic.

F. Content Analysis Module 195

The content analysis module 195 may be operative to analyze, via the processing device, each of the sharing policy data and the second user profile data.

Further, the content analysis module 195 may be operative to determine, via the processing device, one or more of at least one shareable data item and at least one non-shareable data item based on the at least one permission indicator.

Further, the content analysis module 195 may be operative to determine, via the processing device, a target characteristic of the second user account based on analysis of a second user profile data corresponding to the second user account.

Further, the content analysis module 195 may be operative to determine, via the processing device, a shareable data item of the at least one shareable data item based on the target characteristic and one or more of the shareable data item indicator and the non-shareable data item indicator corresponding to the target characteristic.

Further, the interest indicator may include interest policy data representing one or more of a relevant data item and an irrelevant data item. Further, at least one of the content analysis module 195 and the interest policy module 185 may be operative to analyze, via the processing device, each of the interest policy data and the second user profile data. Further, the second user profile data may include the relevant data item and the irrelevant data item. Further, the content analysis module 195 may be operative to determine, via the processing device, one or more of the relevant data item and the irrelevant data item based on the analyzing. Further, the user profile data management module 165 may be operative to transmit, via the communication device, the second user profile data including transmitting the relevant data item.

Further, the content analysis module 195 may be operative to analyze, via the processing device, a plurality of second user profile data of a plurality of second user accounts. Further, the content analysis module 195 may be operative to identify, via the processing device, a plurality of second user characteristics corresponding to the plurality of second user accounts based on the analyzing. Further, the content analysis module 195 may be operative to compare, via the processing device, the at least one desired user characteristic with the plurality of second user characteristics. Further, the content analysis module 195 may be operative to identify, via the processing device, the at least one desired second user account based on the comparing. Further, the content analysis module 195 may be operative to transmit, via the communication device, indication of the at least one desired second user account to the first user device. Further, the first presentation device may be configured for presenting the indication of the at least one desired second user account to the first user.

G. Interest Policy Module 185

Further, the interest policy module 185 may be operative to analyze, via the processing device, each of the interest policy data and the second user profile data.

H. Auto-Update Policy Module 190

The auto-update policy module 190 may be operative to receive, via the communication device, an auto-update policy data from the first user device. The auto-update policy data may allow certain data such as an identity document (e.g. driver's license) to be automatically updated in the first user profile data such as the candidate profile data.

Further, the auto-update policy data may include an indication of at least one condition under which the updated second user profile data may be automatically accepted to be associated with the first user account. Further, the user profile data management module 165 may be operative to analyze, via the processing device, the updated second user profile data in relation to the auto-update policy. Further, the user profile data management module 165 may be operative to automatically associate, via the processing device, the updated second user profile data with the first user account based on the analyzing of the updated second user profile data.

I. Requirement Matching Module 140

The requirement matching module 140 may be operative to receive, via the communication device, a requirement data including at least one desired user characteristic corresponding to at least one desired second user account of the at least one second user. In some embodiments, the requirement data may include a job requirement specification. Accordingly, one or more candidates accounts may be identified and presented to the employer based on a match between the job requirement and one or more candidate profile data of the one or more candidate accounts.

Further, the content analysis module 195 may be operative to analyze, via the processing device, a plurality of second user profile data of a plurality of second user accounts. Further, the content analysis module 195 may be operative to identify, via the processing device, a plurality of second user characteristics corresponding to the plurality of second user accounts based on the analyzing. Further, the content analysis module 195 may be operative to compare, via the processing device, the at least one desired user characteristic with the plurality of second user characteristics. Further, the content analysis module 195 may be operative to identify, via the processing device, the at least one desired second user account based on the comparing. Further, the content analysis module 195 may be operative to transmit, via the communication device, indication of the at least one desired second user account to the first user device. Further, the first presentation device may be configured for presenting the indication of the at least one desired second user account to the first user.

J. Version Management Module 170

The version management module 170 may be operative to manage, via the processing device, multiple versions of the second user profile data.

Various hardware components may be used at the various stages of operations disclosed in the following methods and computer-readable medium. For example, although the methods have been described to be performed by a computing device, it should be understood that, in some embodiments, different operations may be performed by different networked elements in operative communication with the computing device. For example, server 110 and/or computing device 1900 may be employed in the performance of some or all of the stages disclosed with regard to the methods below.

III. Platform Operation

Figure 11:
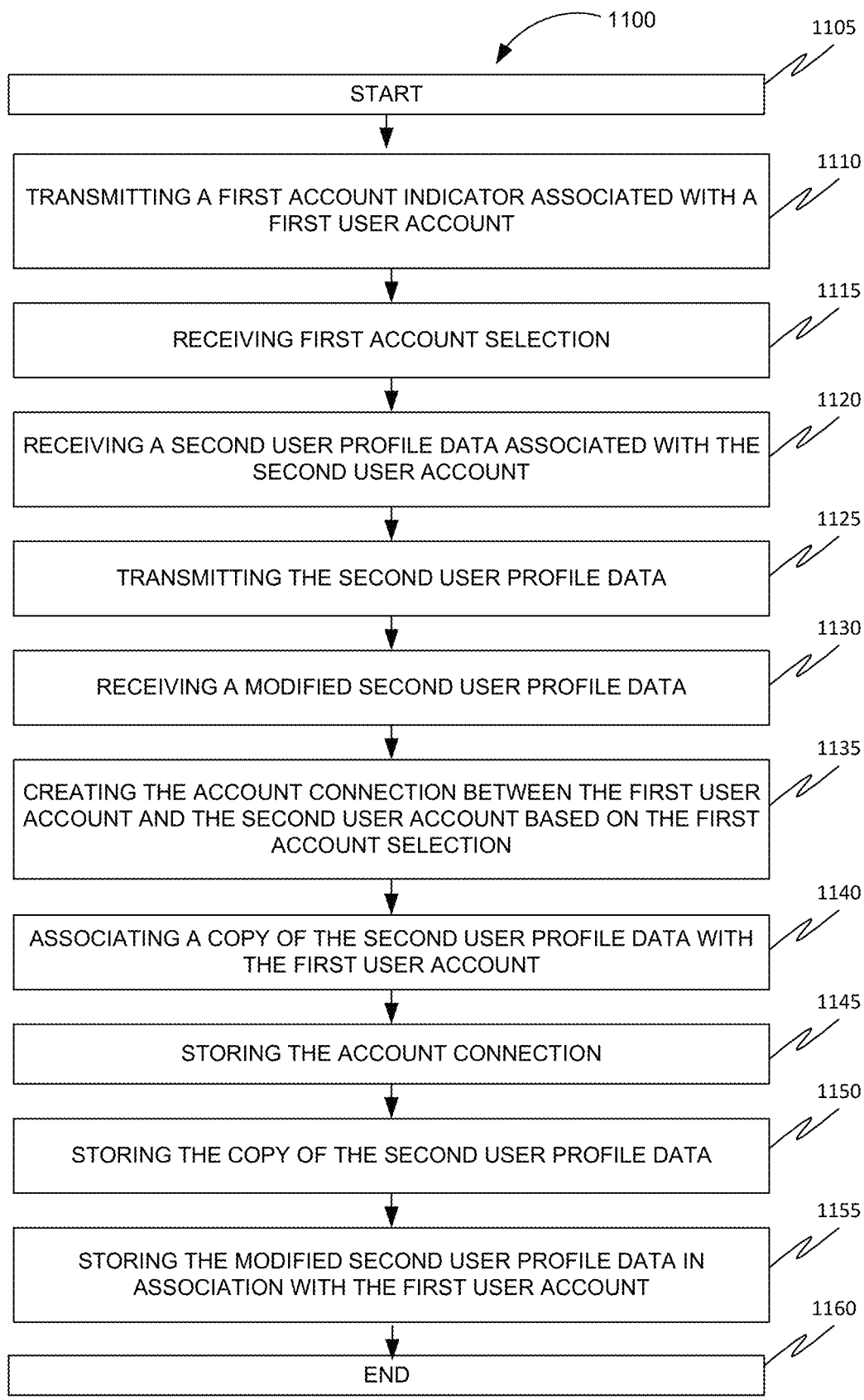
FIG. 11 is a flow chart setting forth the general stages involved in a method consistent with an embodiment of the disclosure for facilitating sharing of data between users.

FIG. 11 is a flow chart setting forth the general stages involved in a method 1100 consistent with an embodiment of the disclosure for facilitating sharing of data between users. Method 1100 may be implemented using a computing device 1900 as described in more detail below with respect to FIG. 19.

Although method 1100 has been described to be performed by computing device 1900, it should be understood that, in some embodiments, different operations may be performed by different networked elements in operative communication with computing device 1900. For example, server 110 and/or computing device 1900 may be employed in the performance of some or all of the stages in method 1100. Moreover, server 110 may be configured much like computing device 1900 and, in some instances, be one and the same embodiment.

Although method 1100 has been described to be performed by platform 100, it should be understood that computing device 1900 may be used to perform the various stages of method 1100. Furthermore, in some embodiments, different operations may be performed by different networked elements in operative communication with computing device 1900. For example, server 110 may be employed in the performance of some or all of the stages in method 1100. Moreover, server 110 may be configured much like computing device 1900.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 1100 will be described in greater detail below.

Method 1100 may begin at starting block 1105 and proceed to stage 1110 where computing device 1900 may transmit, using the communication device, a first account indicator associated with a first user account to a second user device associated with a second user account of a second user of at least one second user. For example, the first user may be an employer. Further, the first user account may be an employer account. Further, the first user device may be an employer device. Moreover, the second user may be a candidate. Further, the second user account may be candidate account. Further, the second user device may be a candidate device. Further, the first account indicator may be comprised in one or more of a job posting, an employer profile page and a recruiter profile page.

Figure 2:
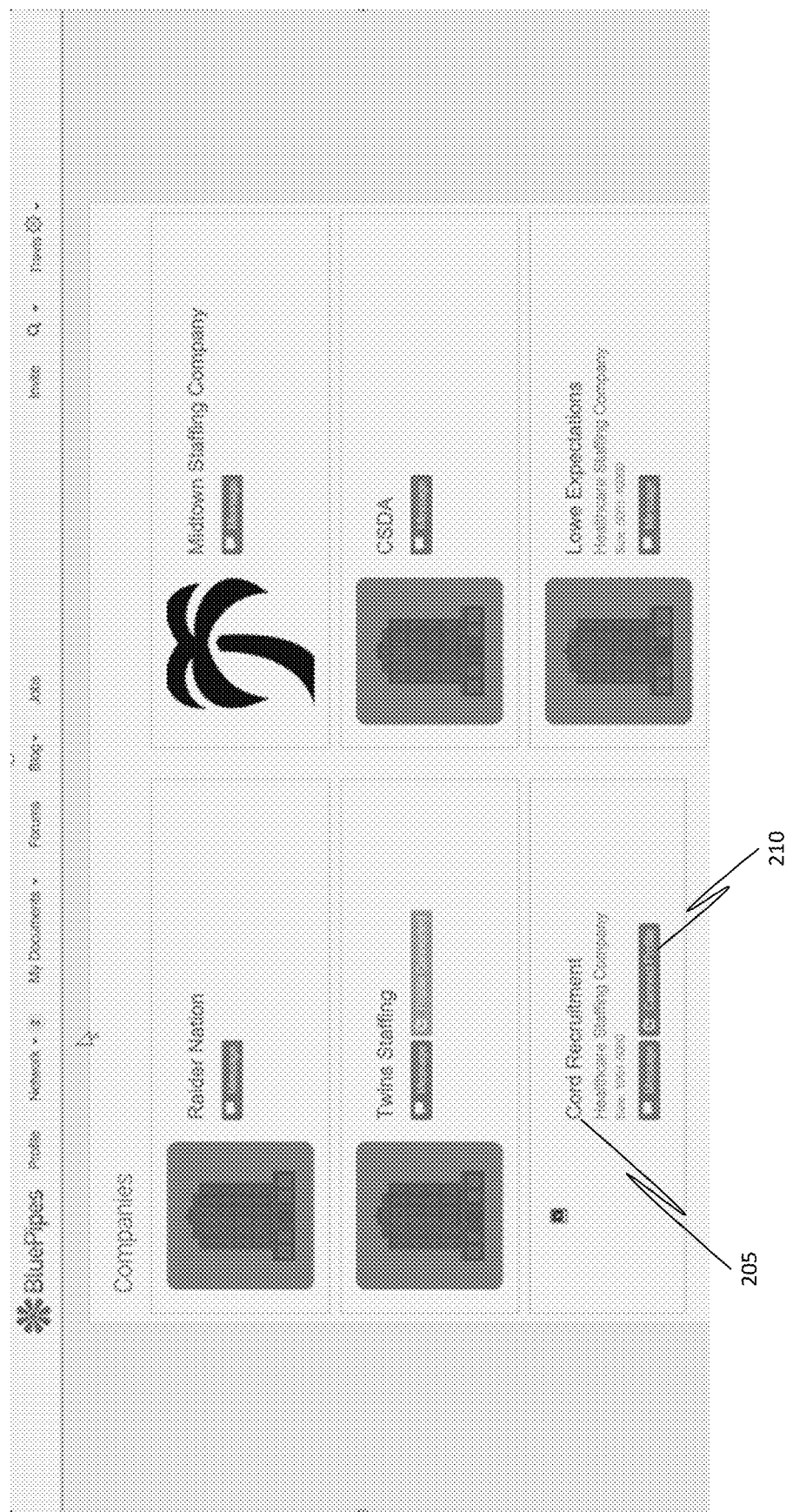
FIG. 2 is a snapshot of a software application showing a list of company names along with company logos, in accordance with an exemplary embodiment.

FIG. 2 is a snapshot 200 of a candidate profile of the software application showing a list of company names (first account indicators) along with company logos, in accordance with an exemplary embodiment. For example, a first account indicator 205 refer to the company name "Cord Recruitment".

In some embodiments, the method 1100 may include receiving, using a communication device, an interest indicator from a first user device associated with the first user account of a first user. Further, the interest indicator may include a consent indicator representing consent of the first user to receive digital content associated with the at least one second user.

Further, the first user device may include a first input device configured for receiving the interest indicator from the first user.

Further, the second user device may include a second presentation device configured for presenting the first account indicator. Further, the second user device further may include a second input device configured for receiving a first account selection associated with the first account indicator from the second user. In an exemplary embodiment, the second user may click a "Connect Profile" button 210 (refer FIG. 2) to provide the first account selection associated with the first account indicator 205 referring to the company name "Cord Recruitment".

Figure 3:
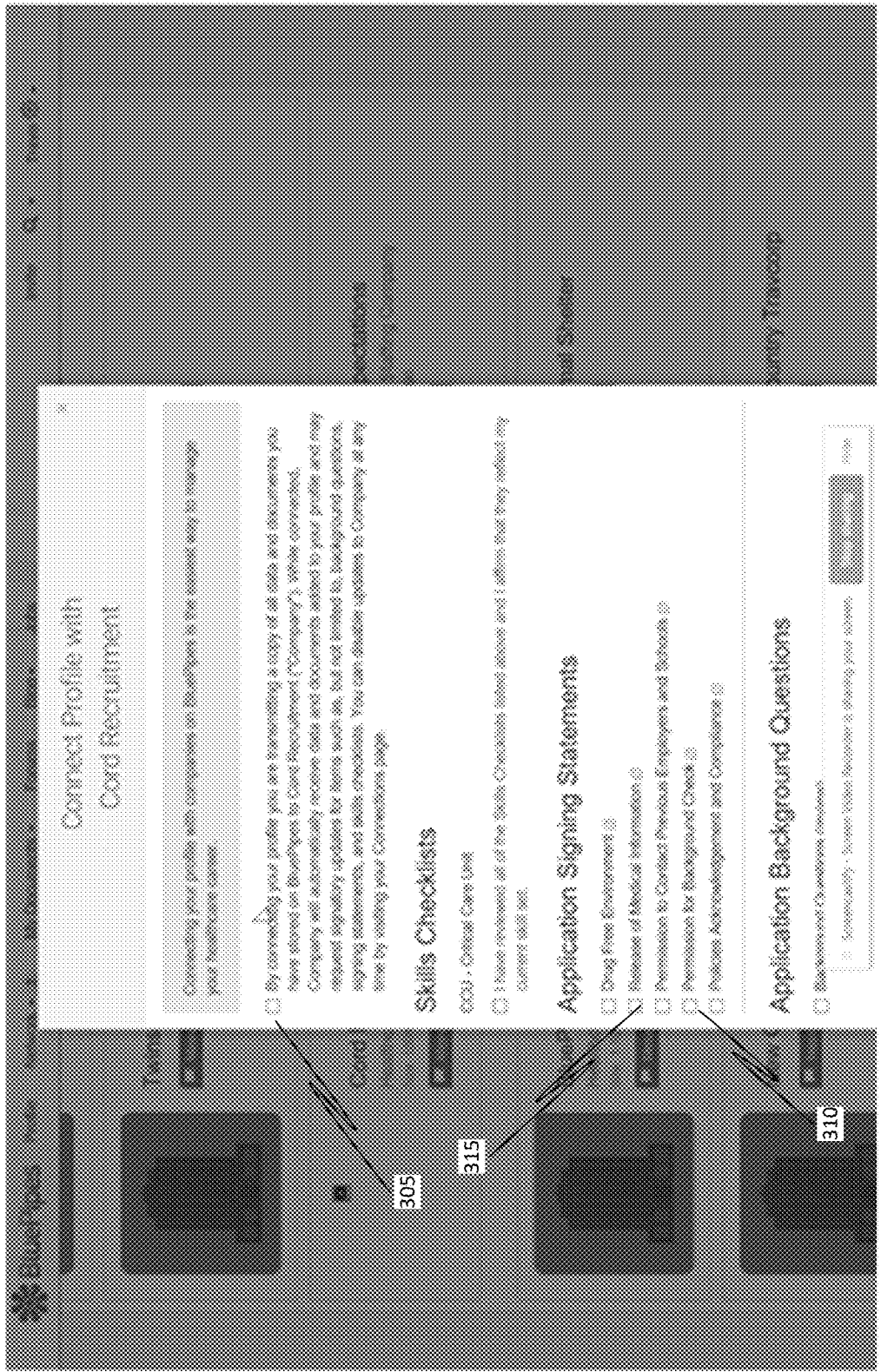
FIG. 3 is a snapshot of the software application showing one or more requirements for connecting a candidate profile with a company, in accordance with an exemplary embodiment.

When the second user clicks the "Connect Profile" button 210, the software application displays one or more requirements (refer FIG. 3) for connecting candidate profile with the corresponding company "Cord Recruitment". FIG. 3 is a snapshot 300 of a candidate profile of the software application showing the one or more requirements for connecting candidate profile with a company, in accordance with an exemplary embodiment. The one or more requirements may include an agreement 305 to allow copying of candidate data to the selected company account, permission to allow for background checks 310, release of medical information 315 etc.

From stage 1110, where computing device 1900 transmits a first account indicator associated with the first user account to a second user device associated with a second user account of a second user of the at least one second user, method 1100 may advance to stage 1115 where computing device 1900 may receive, using the communication device, the first account selection from the second user device.

Once computing device 1900 receives the first account selection from the second user device in stage 1115, method 1100 may continue to stage 1120 where computing device 1900 may receive, using the communication device, a second user profile data associated with the second user account based on the account connection. For example, the second user profile data may include a candidate profile data including one or more of personal profile data, social profile data, educational profile data and work profile data associated with the candidate.

Figure 4:
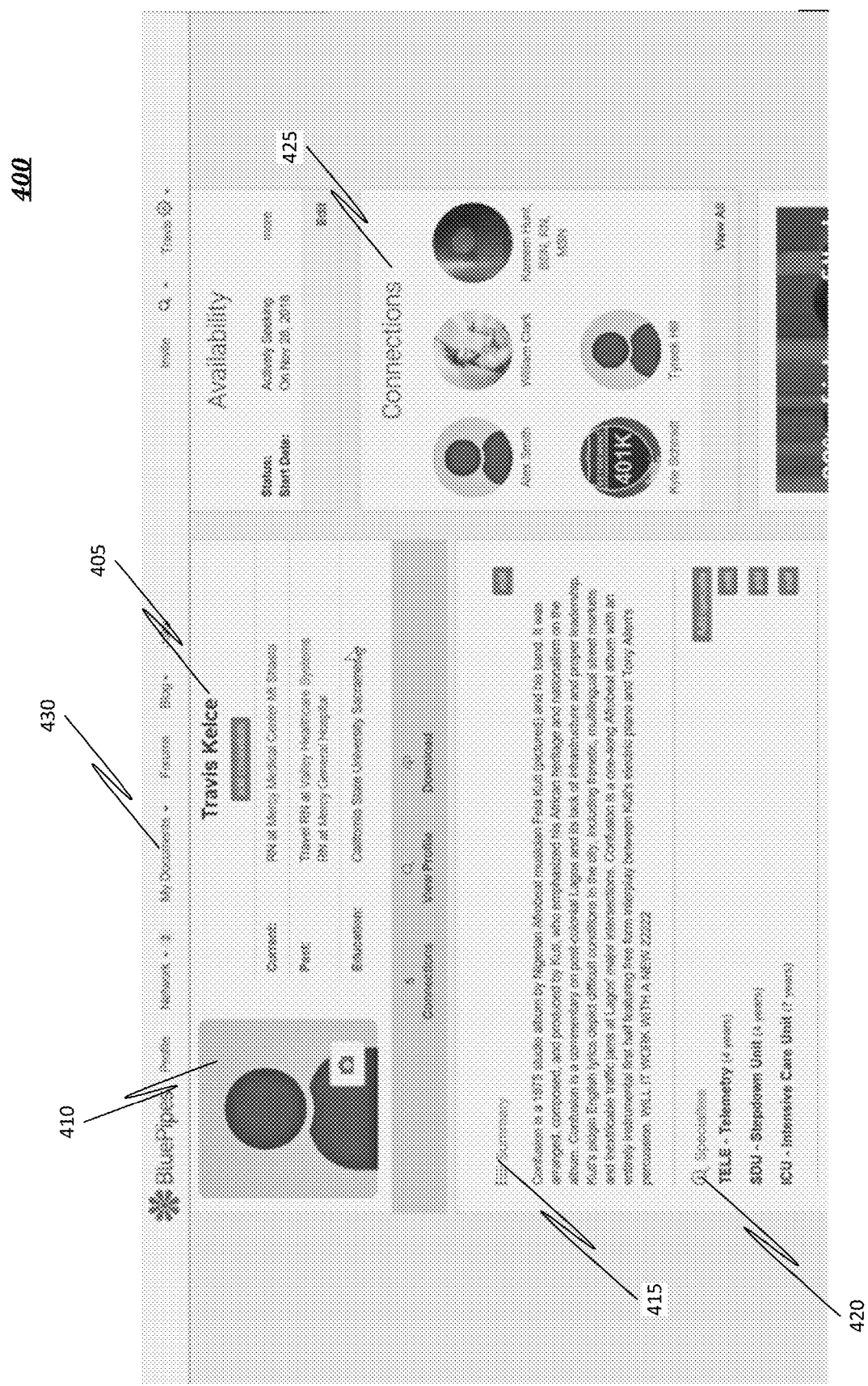
FIG. 4 is a snapshot of the software application showing a candidate profile, in accordance with an exemplary embodiment.
Figure 5:
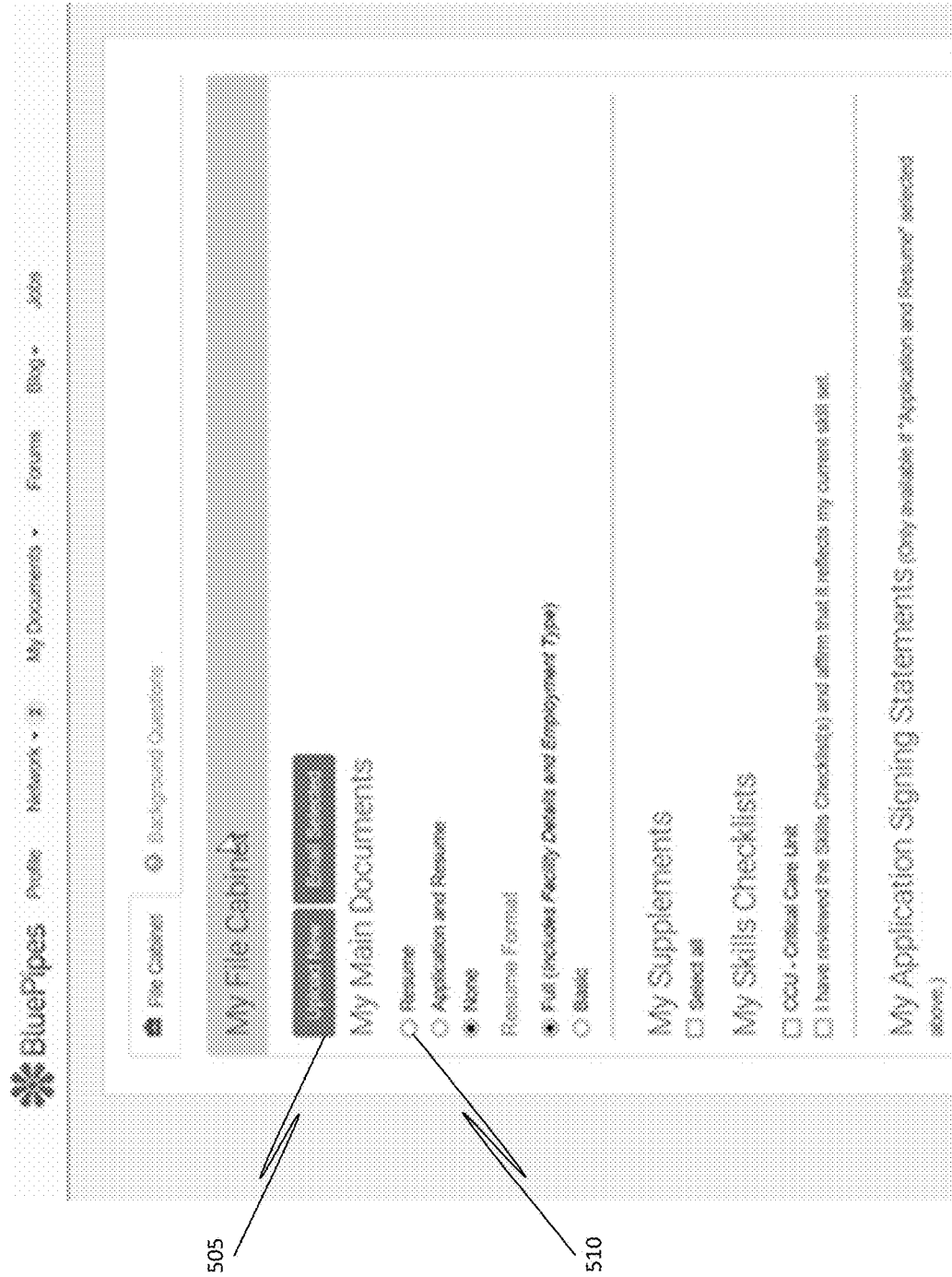
FIG. 5 is a snapshot of a file cabinet feature of the software application, in accordance with an exemplary embodiment.

FIG. 4 is a snapshot 400 of a candidate profile of the software application, in accordance with an exemplary embodiment. The candidate profile includes a "Travis Kelce" candidate name 405, a candidate photo 410, a profile summary 415, a list of specialties 420, connections of the candidate 425 etc. Further, the candidate profile provides access to various features of the software application. For example, a "My Documents" drop-down menu 430 provides access to a "File Cabinet" feature. When the candidate selects the "File Cabinet" feature, the software application displays the user interface shown in a snapshot 500 in FIG. 5. As shown, the "File Cabinet" feature allows the candidate to upload documents using an "Upload New" button 505. For example, the candidate may upload a document like a resume 510.

After computing device 1900 receives a second user profile data associated with the second user account based on the account connection in stage 1120, method 1100 may proceed to stage 1125 where computing device 1900 may transmit, using the communication device, the second user profile data to the first user device. Further, a first presentation device may be configured for presenting the second user profile data to the first user.

After computing device 1900 transmits the second user profile data to the first user device in stage 1125, method 1100 may proceed to stage 1130 where computing device 1900 may receive, using the communication device, a modified second user profile data from the first user device.

Further, the second input device may be configured for receiving a modification input corresponding to the second user profile data from the first user. Further, the first user device further may include a first processor configured for generating the modified second user profile data based on the modification input.

After computing device 1900 receives, using the communication device, a modified second user profile data from the first user device in stage 1130, method 1100 may proceed to stage 1135 where computing device 1900 may create, using a processing device, an account connection between the first user account and the second user account based on the first account selection.

Figure 6:
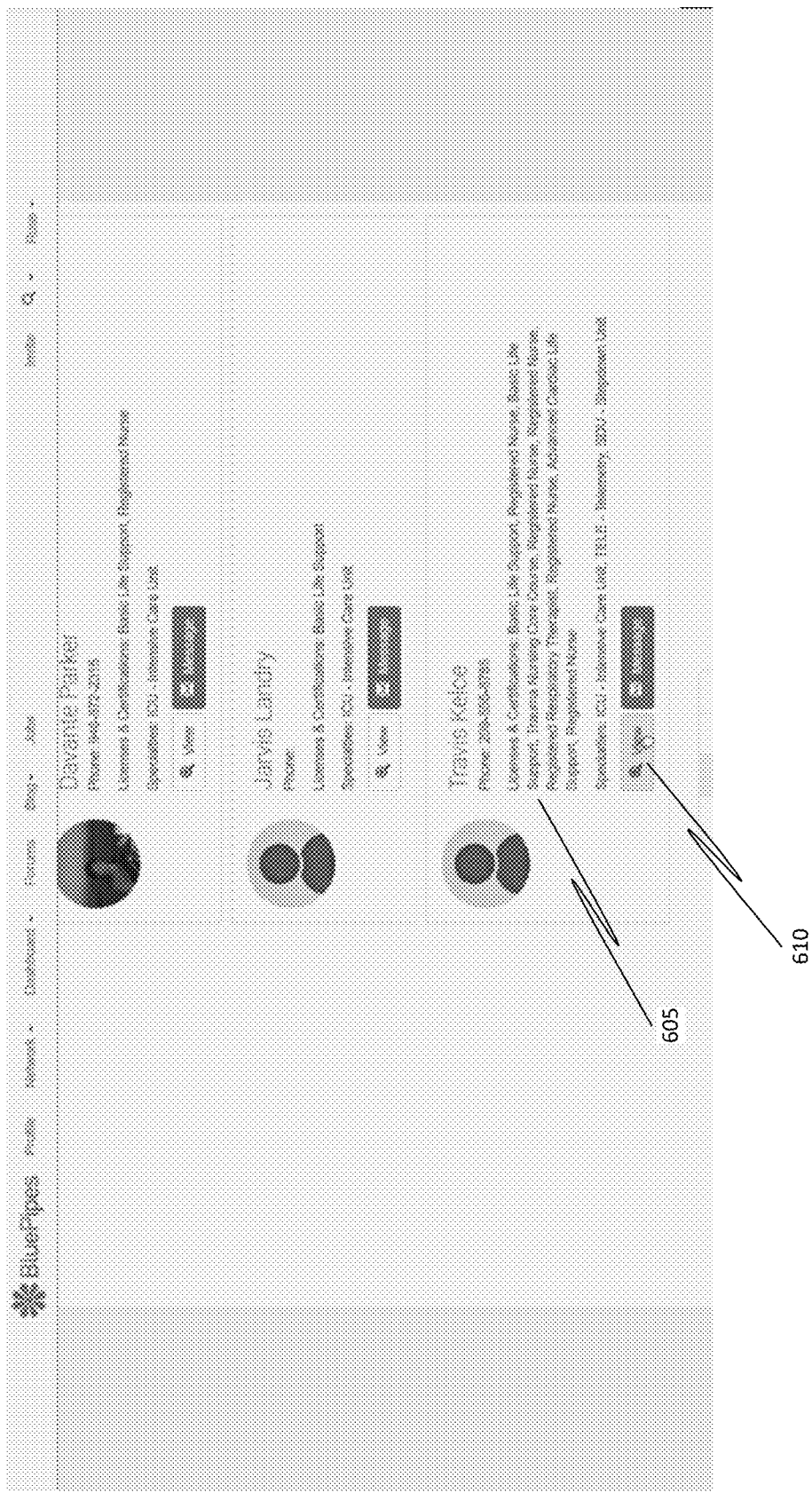
FIG. 6 is a snapshot of the software application showing a list of candidates associated with an employer, in accordance with an exemplary embodiment.
Figure 7:
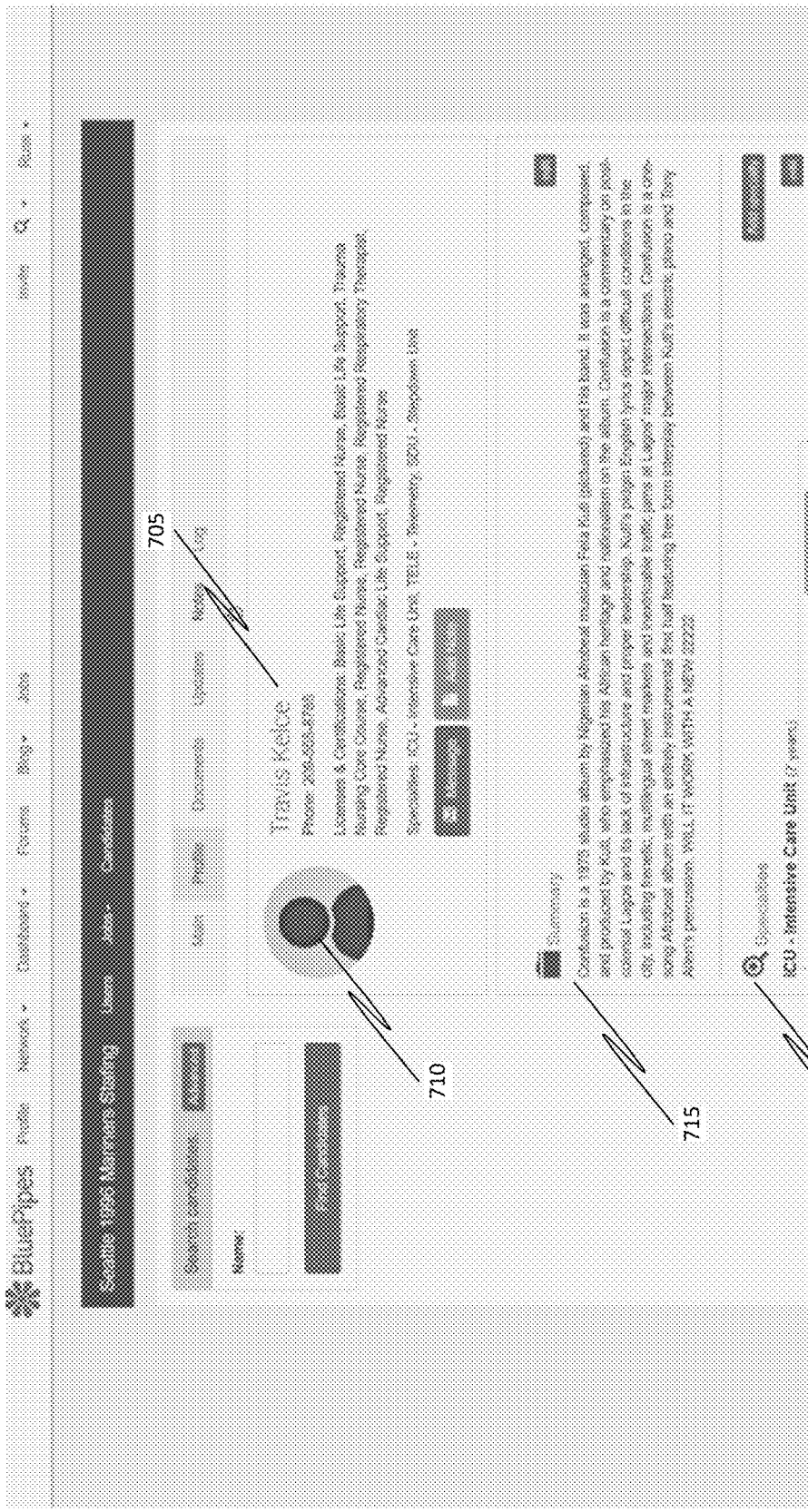
FIG. 7 is a snapshot of the software application showing a candidate profile, in accordance with an exemplary embodiment.

FIG. 6 is a snapshot 600 of an employer profile of the software application showing a list of associated candidates, in accordance with an exemplary embodiment. For example, the candidate "Travis Kelce" 605 is listed, in response to this candidate connecting his profile with this employer as shown in FIG. 2. The employer may click on a "View" button 610 to view the candidate profile. When the employer clicks the "View" button 610, the software application displays the candidate profile as shown in a snapshot 700 in FIG. 7. The candidate profile includes a "Travis Kelce" candidate name 705, a candidate photo 710, a profile summary 715, a list of specialties 720, etc.

After computing device 1900 creates an account connection between the first user account and the second user account based on the first account selection in stage 1135, method 1100 may proceed to stage 1140 where computing device 1900 may associate, using the processing device, a copy of the second user profile data with the first user account. Further, the method 1100 may include storing, using the storage device, the copy of the second user profile data based on an acceptance selection. Further, the acceptance selection represents acceptance of the first user to accept the second user profile data to be associated with the first user account.

In some embodiments, the method 1100 may further include receiving, using the communication device, the acceptance selection from the first user device. Further, the first input device may be configured for receiving the acceptance selection from the first user.

After computing device 1900 associates a copy of the second user profile data with the first user account in stage 1140, method 1100 may proceed to stage 1145 where computing device 1900 may store, using a storage device, the account connection.

After computing device 1900 stores, using a storage device, the account connection in stage 1145, method 1100 may proceed to stage 1150 where computing device 1900 may store, using the storage device, the copy of the second user profile data. In some embodiments, the storing of the copy of the second user profile data is based on the acceptance selection.

After computing device 1900 stores the copy of the second user profile data in stage 1150, method 1100 may proceed to stage 1155 where computing device 1900 may store, using the storage device, the modified second user profile data in association with the first user account.

Once computing device 1900 stores the modified second user profile data in stage 1155, method 1100 may then end at stage 1160.

In some embodiments, the interest indicator may include interest policy data representing one or more of a relevant data item and an irrelevant data item. Further, the method 1100 may include analyzing, using the processing device, each of the interest policy data and the second user profile data. Further, the second user profile data may include the relevant data item and the irrelevant data item. Further, the method may include determining, using the processing device, one or more of the relevant data item and the irrelevant data item based on the analyzing. Further, the transmitting of the second user profile data (in stage 1125) may include transmitting the relevant data item.

Figure 12:
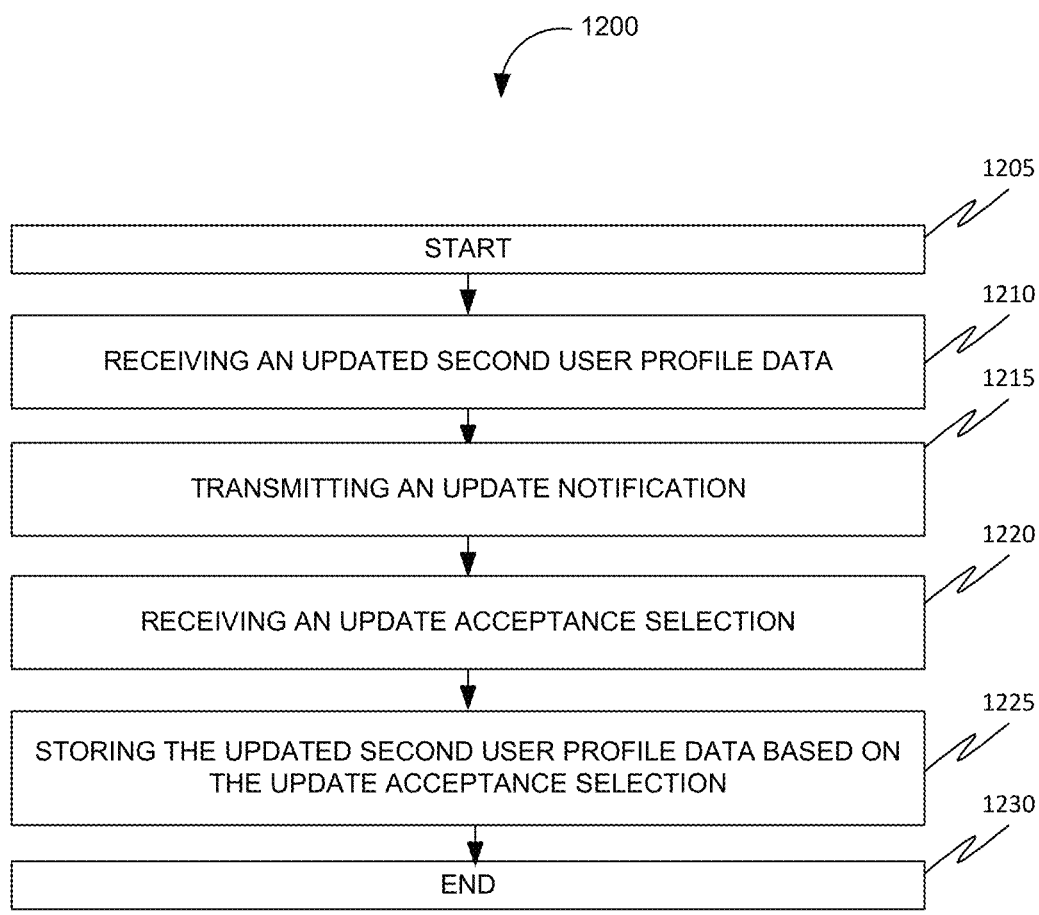
FIG. 12 is a flow chart setting forth the general stages involved in a method consistent with an embodiment of the disclosure for updating a second user profile.

FIG. 12 is a flow chart setting forth the general stages involved in a method 1200 consistent with an embodiment of the disclosure for updating a second user profile. Method 1200 may be implemented using a computing device 1900 as described in more detail below with respect to FIG. 19.

Method 1200 may begin at starting block 1205 and proceed to stage 1210 where computing device 1900 may receive, using the communication device, an updated second user profile data from the second user device. Further, the second input device may be configured for receiving an updation input corresponding to the second user profile data. Further, the second user device may include a second processor configured for generating the updated second user profile data based on the updation input.

Figure 8:
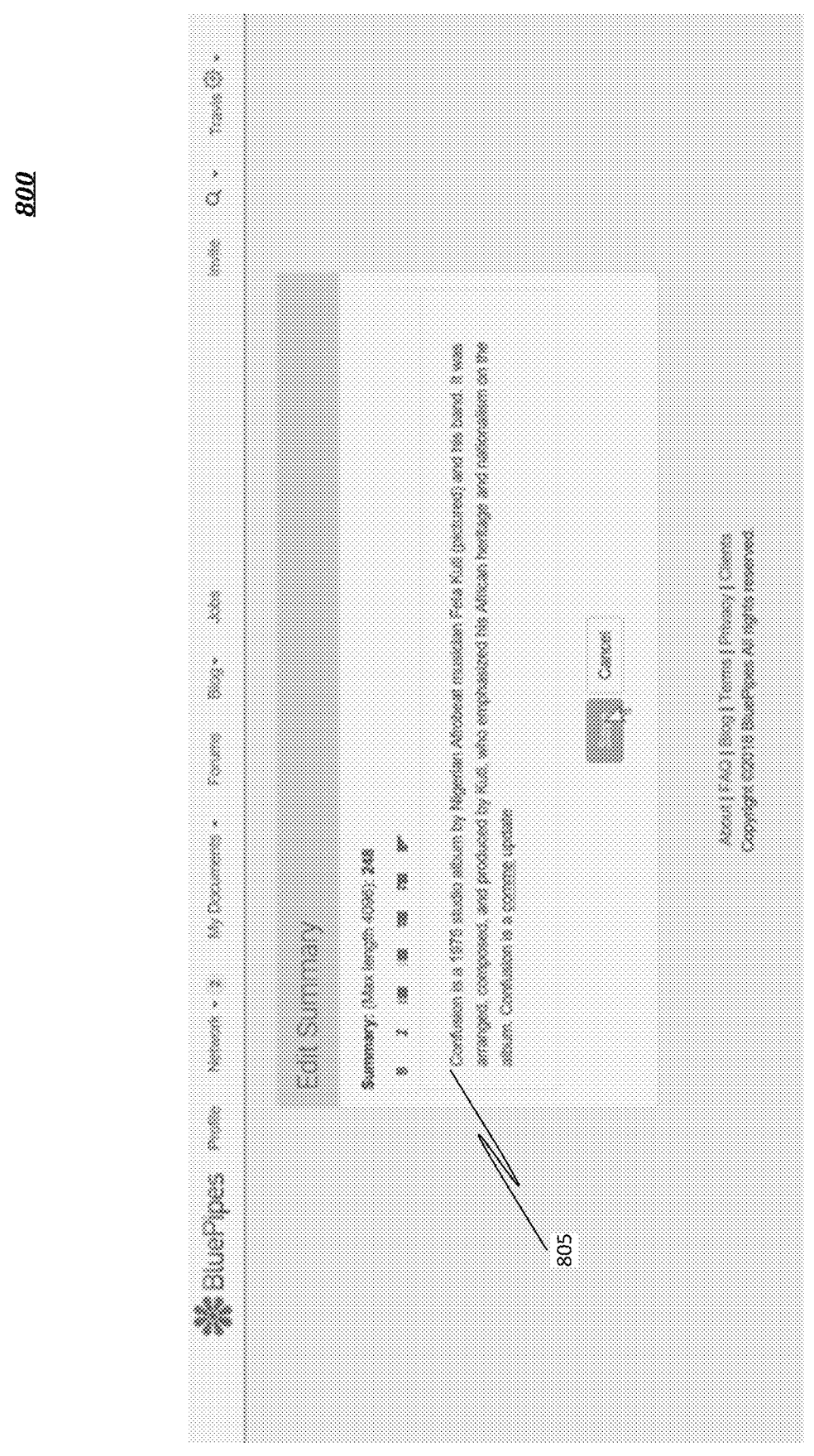

For example, the second user (the candidate) may update the candidate profile (the second user profile data) via the software application as shown in a snapshot 800 of FIG. 8. As shown, the second user may modify summary using a text box 805. Once, the candidate updates the candidate profile, an updated second user profile data is sent from the candidate device (the second user device).

After computing device 1900 receives updated second user profile data from the second user device in stage 1210, method 1200 may proceed to stage 1215 where computing device 1900 may transmit, using the communication device, an update notification to the first user device. Further, the update notification may include the updated second user profile data. Further, the first presentation device may be configured for presenting the update notification to the first user. For example, the software application may display the received update notification in an update page 905 as shown in a snapshot 900 of FIG. 9. Further, the update page 905 may display a current section 910 (before the update) and an updated section 915 (an update summary). Further, the update page 905 may display an "Accept" button 920 and a "Reject" button 925. The employer may click the "Accept" button 920 to accept the update made by the candidate. Alternatively, the employer may click the "Reject" button 925 to reject the update made by the candidate.

After computing device 1900 transmits update notification to the first user device in stage 1215, method 1200 may proceed to stage 1220 where computing device 1900 may receive, using the communication device, an update acceptance selection from the first user device. Further, the update acceptance selection may represent acceptance of the first user to accept the updated second user profile data to be associated with the first user account. For example, the employer may click the "Accept" button 920 on the employer device (the first user device) to send the update acceptance selection.

After computing device 1900 receives update acceptance selection from the first user device in stage 1220, method 1200 may proceed to stage 1225 where computing device 1900 may store, using the storage device, the updated second user profile data based on the update acceptance selection.

Once computing device 1900 stores the updated second user profile data in stage 1225, method 1200 may then end at stage 1230.

Figure 13:
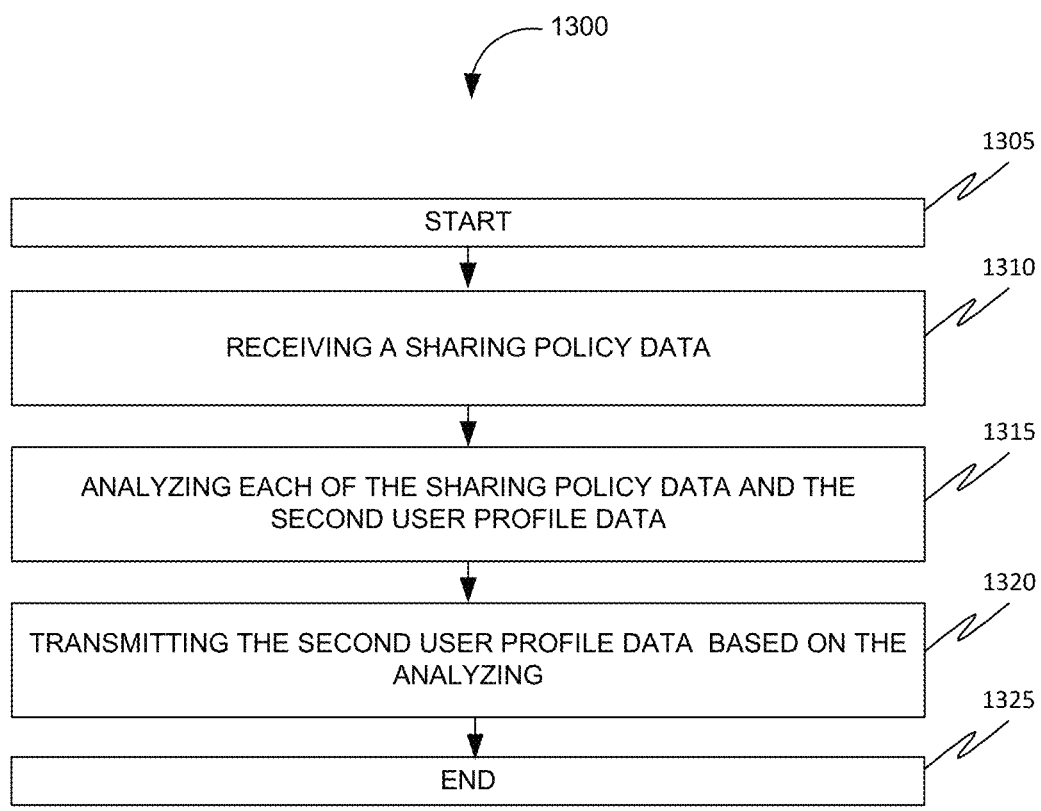
FIG. 13 is a flow chart setting forth the general stages involved in a method consistent with an embodiment of the disclosure for sharing a second user profile data.

FIG. 13 is a flow chart setting forth the general stages involved in a method 1300 consistent with an embodiment of the disclosure for sharing second user profile data. Method 1300 may be implemented using a computing device 1900 as described in more detail below with respect to FIG. 19.

Figure 10A:
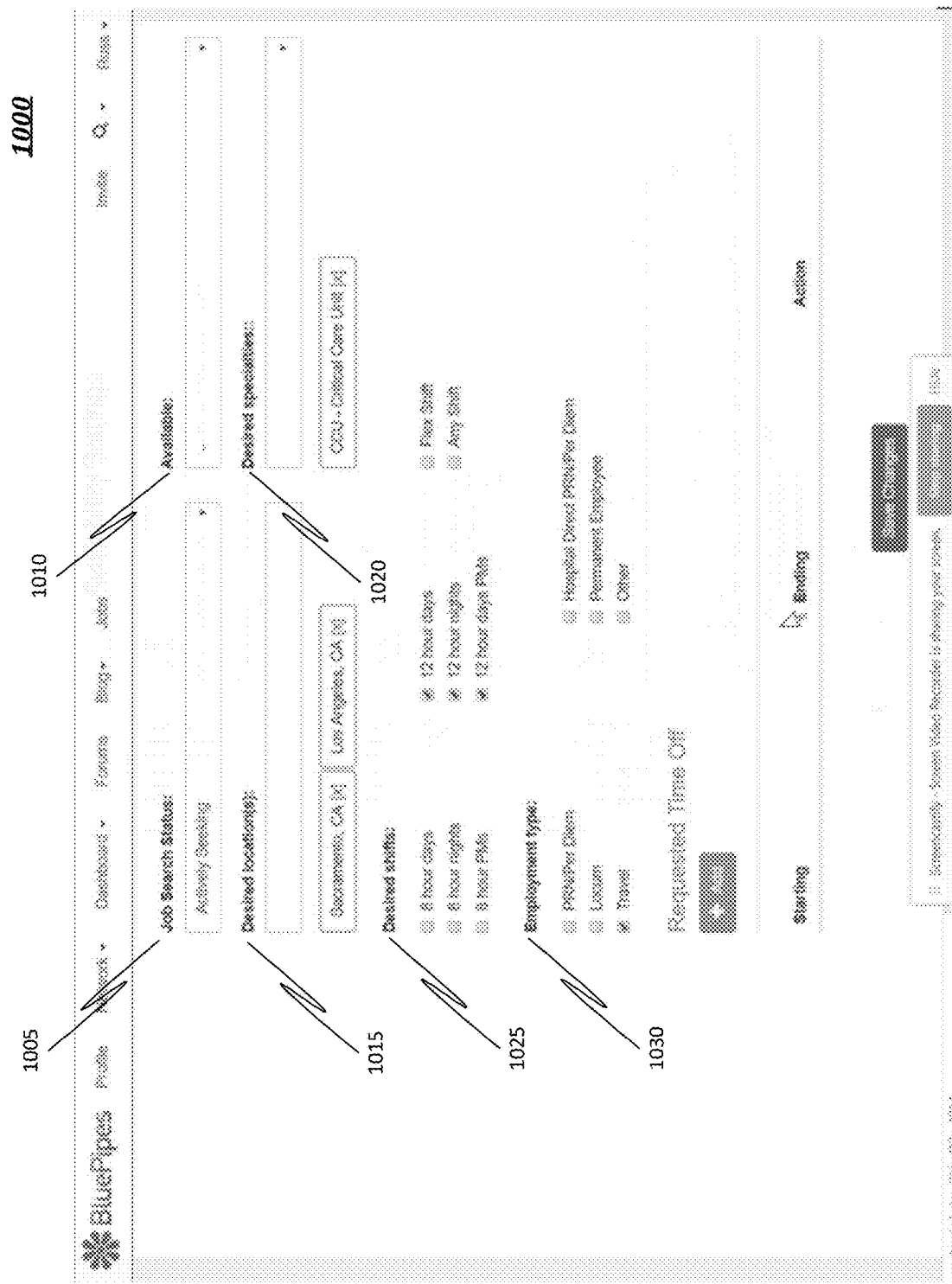
FIG. 10A is a snapshot of the software application showing a requirement data, in accordance with an exemplary embodiment.
Figure 10B:
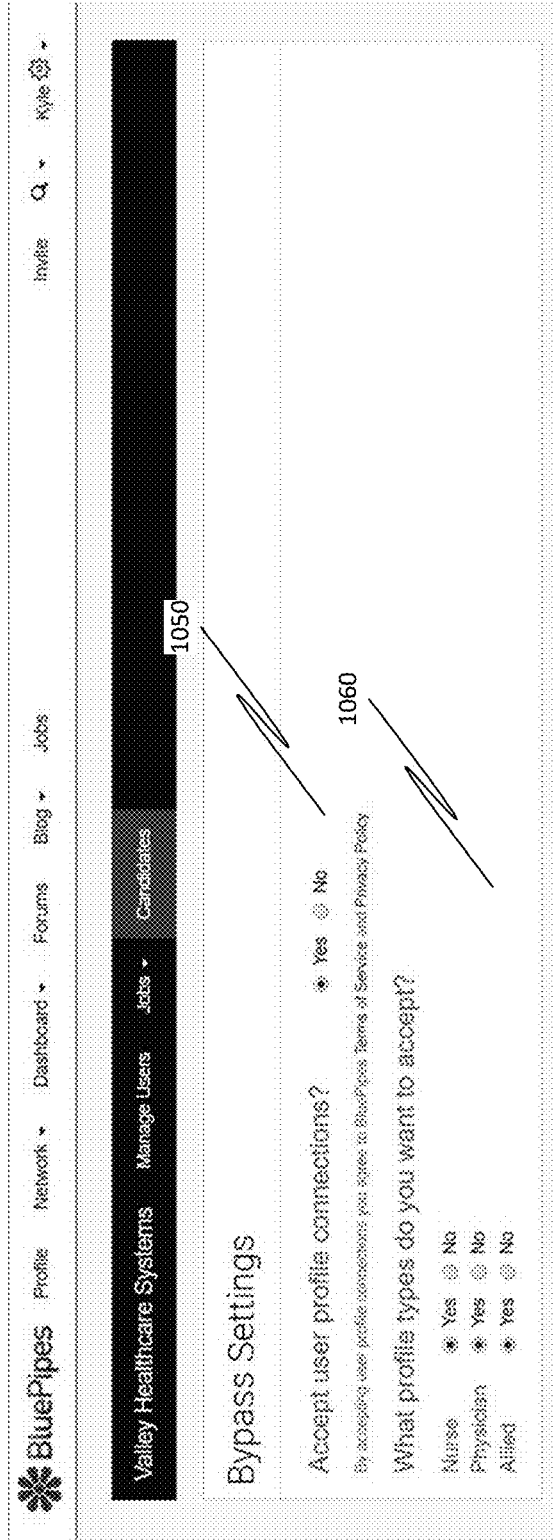
FIG. 10B is a snapshot of the software application showing acceptance rules, in accordance with an exemplary embodiment.

Method 1300 may begin at starting block 1305 and proceed to stage 1310 where computing device 1900 may receive, using the communication device, a sharing policy data from the second user device. Further, the second input device may be configured for receiving the sharing policy data from the second user. FIG. 10B illustrates profile connection settings. In some embodiments, sharing policy may be rules-based and automated. For example, a user of platform 100 may be configured to set parameters for auto-accepting connections. The parameters for auto-accepting the modifications may be specified by a user profile with a first selection 1050. The user may be further enabled to designate which profile types 1060 that qualify for the sharing policy.

After computing device 1900 receives sharing policy data from the second user device in stage 1310, method 1300 may proceed to stage 1315 where computing device 1900 may analyze, using the processing device, each of the sharing policy data and the second user profile data.

After computing device 1900 analyzes each of the sharing policy data and the second user profile data in stage 1315, method 1300 may proceed to stage 1320 where computing device 1900 may transmit, using the communication device, the second user profile data to the first user device based on the analyzing.

Once computing device 1900 transmits, using the communication device, the second user profile data in stage 1320, method 1300 may then end at stage 1325.

In some embodiments, the sharing policy data may include at least one permission indicator associated with at least one data item. Further, the method 1300 may include determining, using the processing device, one or more of at least one shareable data item and at least one non-shareable data item based on the at least one permission indicator. Further, the second user profile data may include a plurality of data items including the at least one shareable data item and the at least one non-shareable data item. Further, the transmitting of the second user profile data (in stage 1320) may include transmitting the at least one shareable data item.

In some embodiments, the sharing policy data may include a plurality of target characteristics corresponding to a plurality of second user accounts. Further, each target characteristic may be associated with one or more of a shareable data item indicator and a non-shareable data item indicator. Further, the method 1300 may include determining, using the processing device, a target characteristic of the second user account based on analysis of a second user profile data corresponding to the second user account. Further, the method 1300 may include determining, using the processing device, a shareable data item of the at least one shareable data item based on the target characteristic and one or more of the shareable data item indicator and the non-shareable data item indicator corresponding to the target characteristic.

Figure 14:
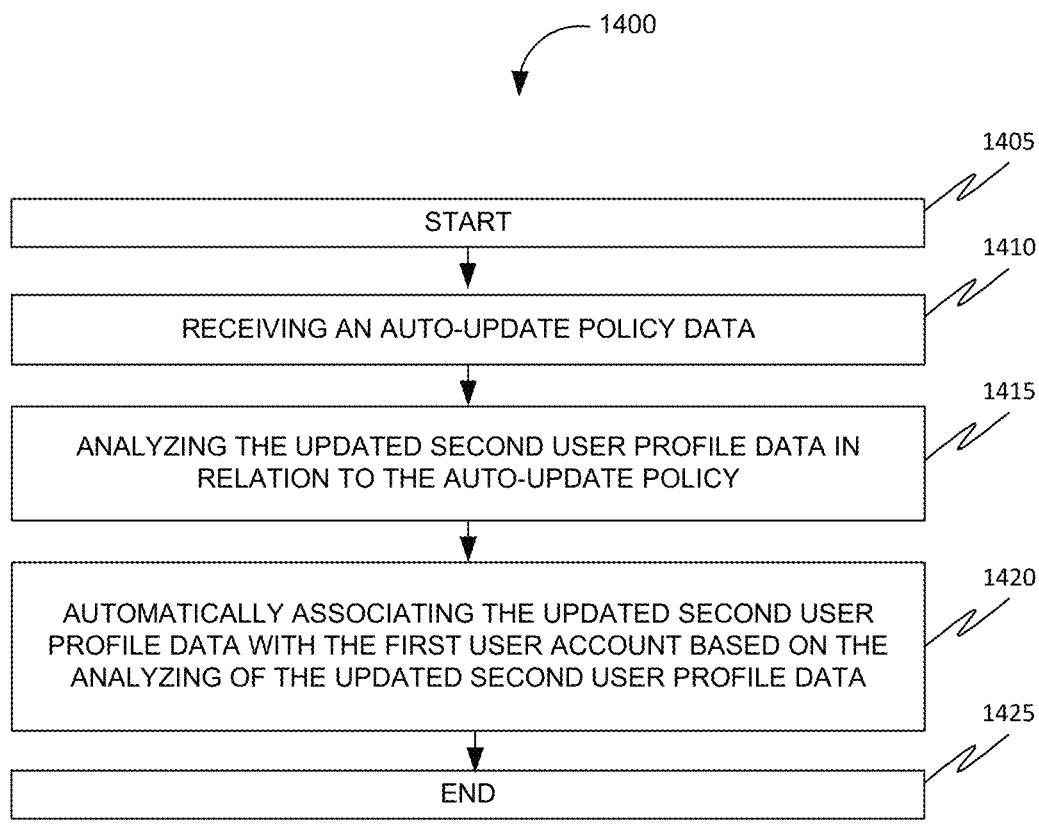
FIG. 14 is a flow chart setting forth the general stages involved in a method consistent with an embodiment of the disclosure for automatically associating an updated second user profile data with a first user account.

FIG. 14 is a flow chart setting forth the general stages involved in a method 1400 consistent with an embodiment of the disclosure for automatically associating an updated second user profile data with a first user account. Method 1400 may be implemented using a computing device 1900 as described in more detail below with respect to FIG. 19.

Method 1400 may begin at starting block 1405 and proceed to stage 1410 where computing device 1900 may receive, using the communication device, an auto-update policy data from the first user device. Further, the auto-update policy data may include an indication of at least one condition under which the updated second user profile data may be automatically accepted to be associated with the first user account.

After computing device 1900 receives auto-update policy data from the first user device in stage 1410, method 1400 may proceed to stage 1415 where computing device 1900 may analyze, using the processing device, the updated second user profile data in relation to the auto-update policy.

After computing device 1900 analyzes the updated second user profile data in relation to the auto-update policy in stage 1415, method 1400 may proceed to stage 1420 where computing device 1900 may automatically associate, using the processing device, the updated second user profile data with the first user account based on the analyzing of the updated second user profile data.

Once computing device 1900 automatically associates the updated second user profile data with the first user account in stage 1420, method 1400 may then end at stage 1425.

Figure 15:
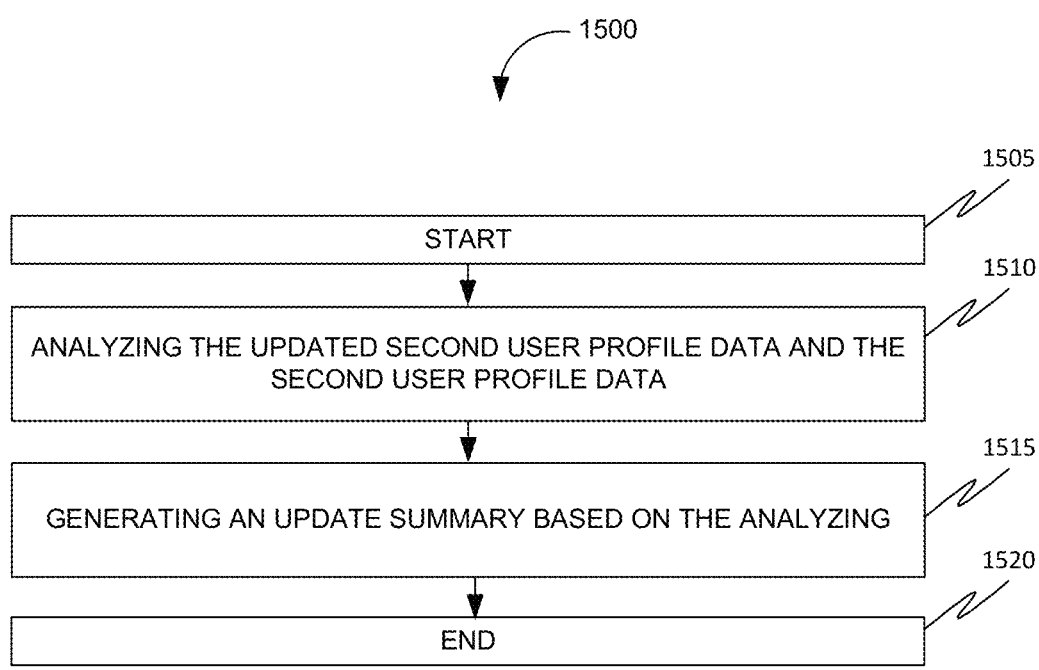
FIG. 15 is a flow chart setting forth the general stages involved in a method consistent with an embodiment of the disclosure for obtaining an update handler.

FIG. 15 is a flow chart setting forth the general stages involved in a method 1500 consistent with an embodiment of the disclosure for obtaining an update summary. Method 1500 may be implemented using a computing device 1900 as described in more detail below with respect to FIG. 19.

Method 1500 may begin at starting block 1505 and proceed to stage 1510 where computing device 1900 may analyze, using the processing device, the updated second user profile data, and the second user profile data.

Figure 9:
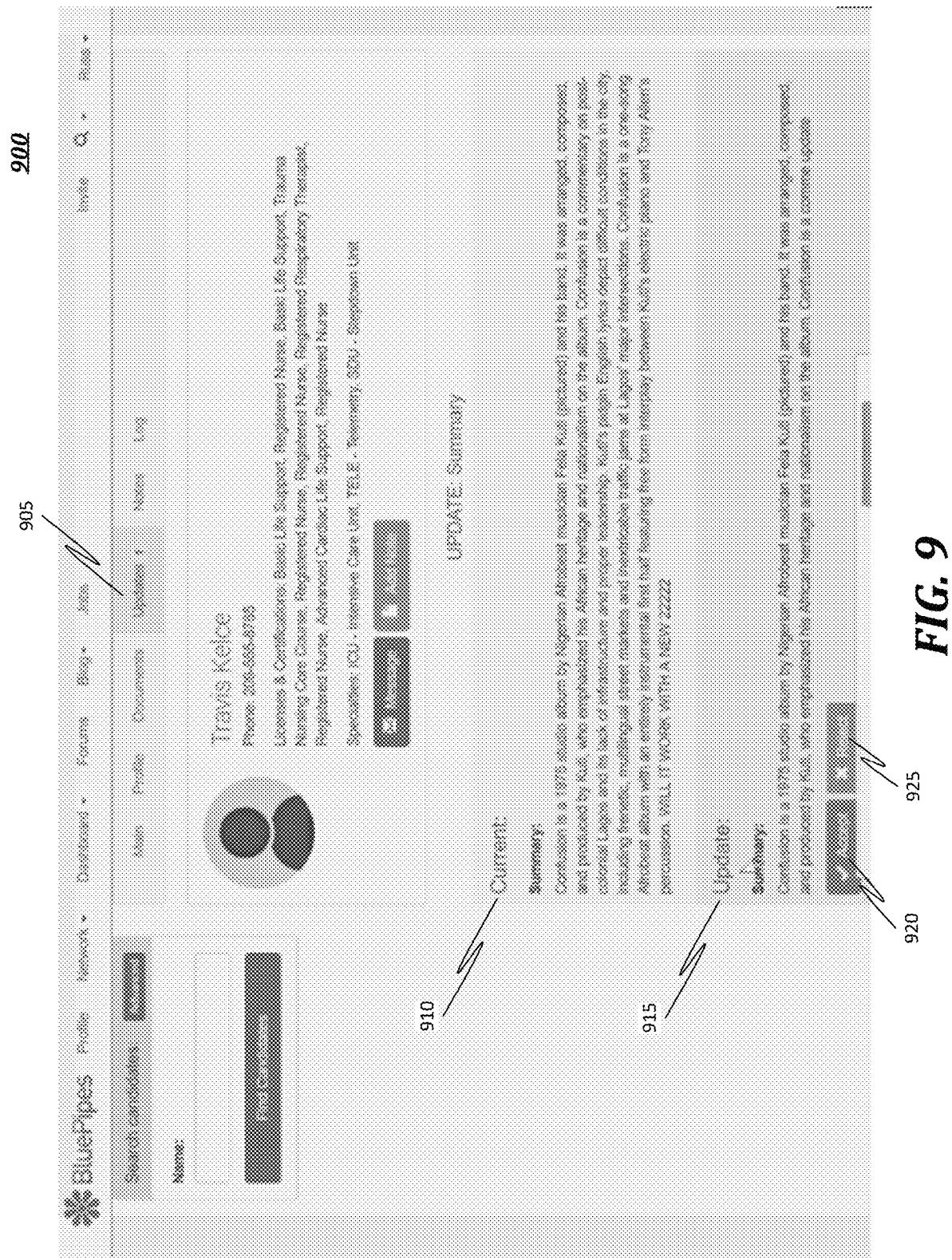
FIG. 9 is a snapshot of the software application showing a received update notification, in accordance with an exemplary embodiment.

After computing device 1900 analyzes the updated second user profile data and the second user profile data in stage 1510, method 1500 may proceed to stage 1515 where computing device 1900 may generate, using the processing device, an update summary based on the analyzing. Further, the update notification may include the update summary. For example, an updated section 915 (refer FIG. 9 shows an update summary in accordance with an exemplary embodiment).

Once computing device 1900 generates an update summary in stage 1515, method 1500 may then end at stage 1520.

Figure 16:
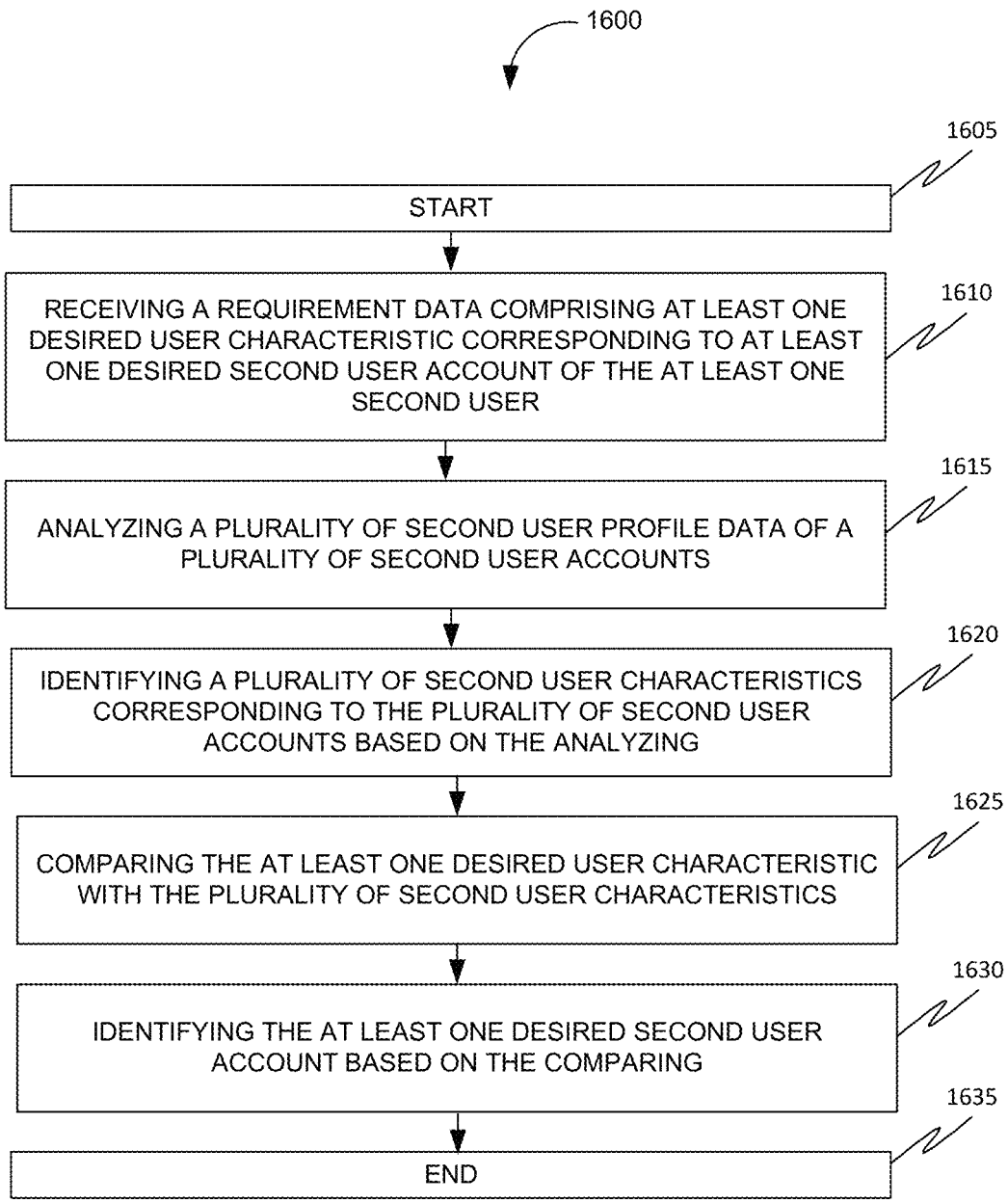
FIG. 16 is a flow chart setting forth the general stages involved in a method consistent with an embodiment of the disclosure for obtaining a list of second users matching job requirements.

FIG. 16 is a flow chart setting forth the general stages involved in a method 1600 consistent with an embodiment of the disclosure for obtaining a list of second users (the candidates) matching job requirements. Method 1600 may be implemented using a computing device 1900 as described in more detail below with respect to FIG. 19.

Method 1600 may begin at starting block 1605 and proceed to stage 1610 where computing device 1900 may receive, using the communication device, a requirement data including at least one desired user characteristic corresponding to at least one desired second user account of the at least one second user. For example, the at least one desired user characteristic may include one or more of a job search status 1005, an availability status 1010, desired locations 1015, desired specialties 1020, desired shifts 1025 and employment type 1030 as shows in a snapshot 1000 of FIG. 10.

After computing device 1900 receives requirement data in stage 1610, method 1600 may proceed to stage 1615 where computing device 1900 may analyze, using the processing device, a plurality of second user profile data of a plurality of second user accounts.

After computing device 1900 analyzes the plurality of second user profile data of a plurality of second user accounts in stage 1615, method 1600 may proceed to stage 1620 where computing device 1900 may identify, using the processing device, a plurality of second user characteristics corresponding to the plurality of second user accounts based on the analyzing.

After computing device 1900 identifies the plurality of second user characteristics in stage 1620, method 1600 may proceed to stage 1625 where computing device 1900 may compare, using the processing device, the at least one desired user characteristic with the plurality of second user characteristics.

After computing device 1900 compares the at least one desired user characteristic with the plurality of second user characteristics in stage 1625, method 1600 may proceed to stage 1630 where computing device 1900 may identify, using the processing device, the at least one desired second user account based on the comparing. Further, the computing device 1900 may transmit an indication of the at least one desired second user account to the first user device. Further, the first presentation device may be configured for presenting the indication of the at least one desired second user account to the first user.

Once computing device 1900 identifies the at least one desired second user account in stage 1630, method 1600 may then end at stage 1635.

Figure 17:
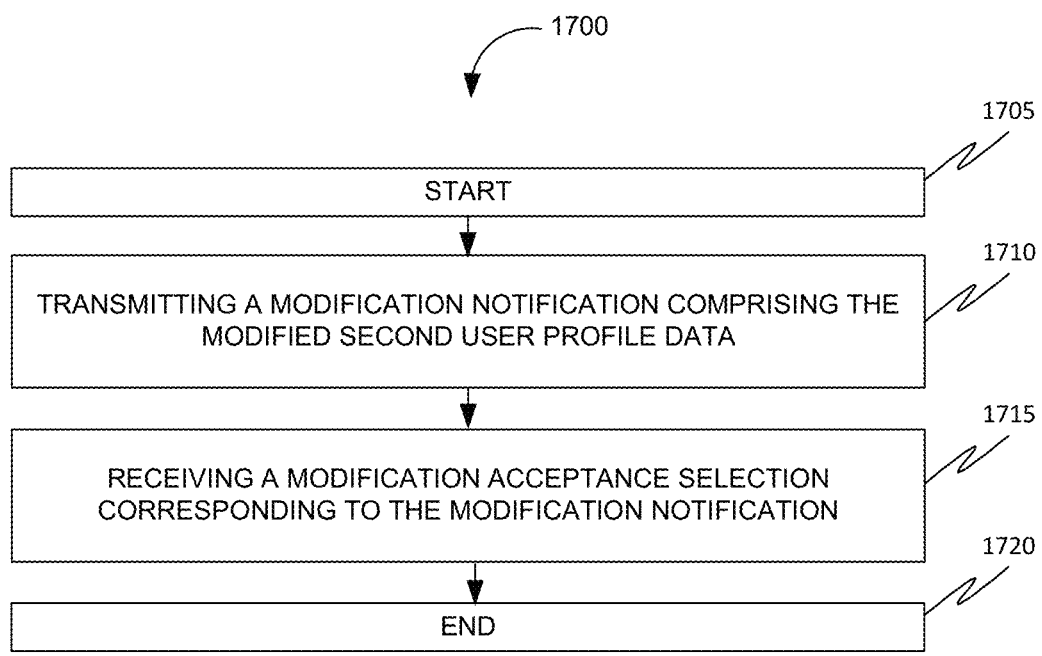
FIG. 17 is a flow chart setting forth the general stages involved in a method consistent with an embodiment of the disclosure for modifying a second user profile data by a first user.

FIG. 17 is a flow chart setting forth the general stages involved in a method 1700 consistent with an embodiment of the disclosure for modifying a second user profile data by a first user. Method 1700 may be implemented using a computing device 1900 as described in more detail below with respect to FIG. 19.

Method 1700 may begin at starting block 1705 and proceed to stage 1710 where computing device 1900 may transmit, using the communication device, a modification notification including the modified second user profile data to the second user device. Further, the second presentation device may be configured for presenting the modification notification to the second user.

After computing device 1900 transmits modification notification in stage 1710, method 1700 may proceed to stage 1715 where computing device 1900 may receive, using the communication device, a modification acceptance selection from the second user device corresponding to the modification notification. Further, the second input device may be configured for receiving the modification acceptance selection from the second user.

Further, the method 1700 may include storing, using the storage device, the modified second user profile data in association with the first user account based on the modification acceptance selection.

Once computing device 1900 receives a modification acceptance selection in stage 1715, method 1700 may then end at stage 1720.

Figure 18:
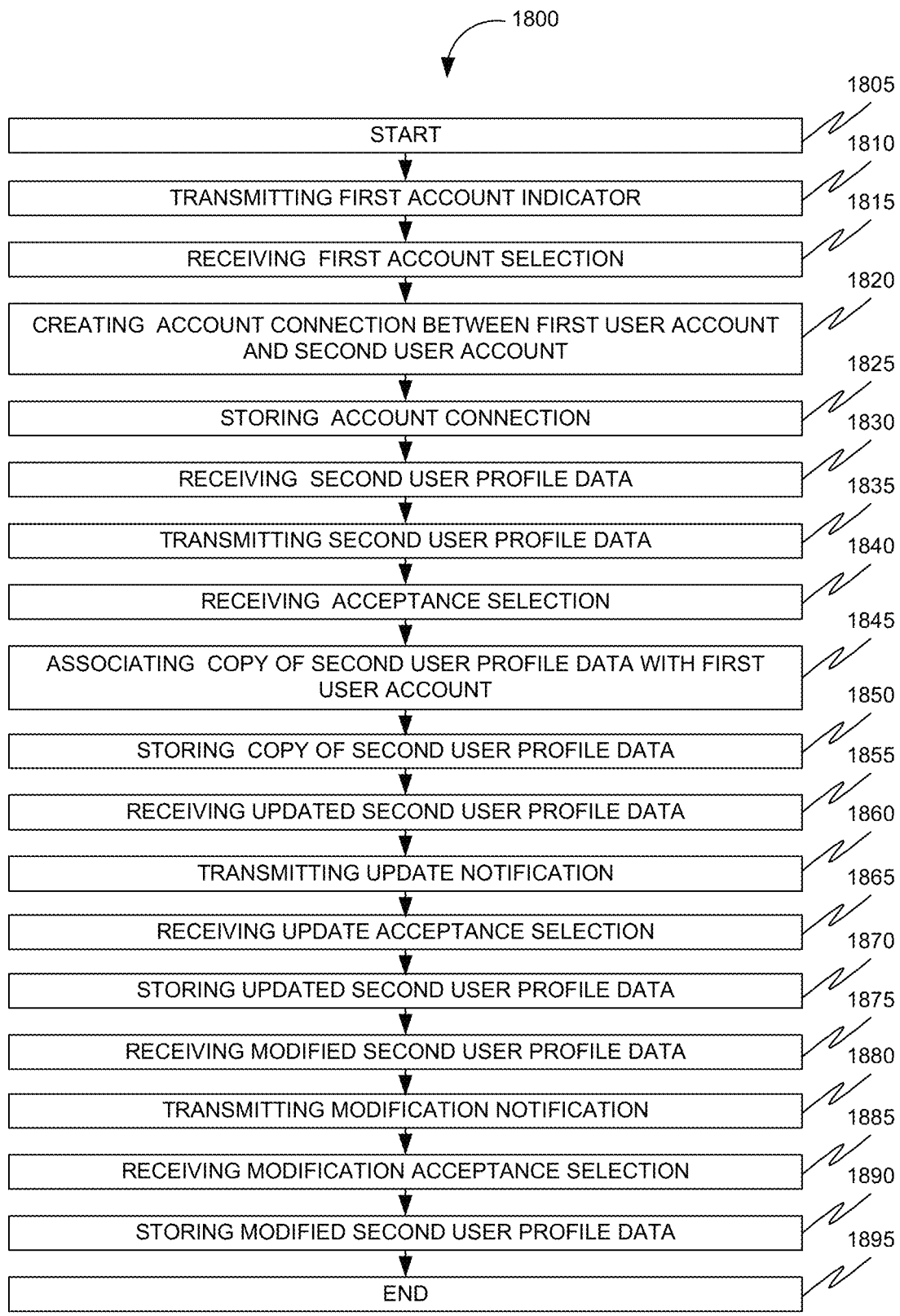
FIG. 18 is a flow chart setting forth the general stages involved in a method consistent with an embodiment of the disclosure for facilitating sharing of data between users.

FIG. 18 is a flow chart setting forth the general stages involved in a method 1800 consistent with an embodiment of the disclosure for facilitating sharing of data between users. Method 1800 may be implemented using a computing device 1900 as described in more detail below with respect to FIG. 19.

Method 1800 may begin at starting block 1805 and proceed to stage 1810 where computing device 1900 may transmit, using a communication device, a first account indicator associated with a first user account to a second user device associated with a second user account of a second user of at least one second user.

After computing device 1900 transmits first account indicator in stage 1810, method 1800 may proceed to stage 1815 where computing device 1900 may receive, using the communication device, the first account selection from the second user device.

After computing device 1900 receives the first account selection in stage 1815, method 1800 may proceed to stage 1820 where computing device 1900 may create, using a processing device, an account connection between the first user account and the second user account based on the first account selection.

After computing device 1900 creates account connection in stage 1820, method 1800 may proceed to stage 1825 where computing device 1900 may store, using a storage device, the account connection.

After computing device 1900 stores the account connection in stage 1825, method 1800 may proceed to stage 1830 where computing device 1900 may receive, using the communication device, a second user profile data associated with the second user account based on the account connection.

After computing device 1900 receives second user profile data in stage 1830, method 1800 may proceed to stage 1835 where computing device 1900 may transmit, using the communication device, the second user profile data to the first user device.

After computing device 1900 transmits the second user profile data in stage 1835, method 1800 may proceed to stage 1840 where computing device 1900 may receive, using the communication device, an acceptance selection from the first user device. The acceptance selection represents acceptance of the first user to accept the second user profile data to be associated with the first user account.

After computing device 1900 receives acceptance selection in stage 1840, method 1800 may proceed to stage 1845 where computing device 1900 may associate, using the processing device, a copy of the second user profile data with the first user account.

After computing device 1900 associates copy of the second user profile data with the first user account in stage 1845, method 1800 may proceed to stage 1850 where computing device 1900 may store, using the storage device, the copy of the second user profile data.

After computing device 1900 stores the copy of the second user profile data in stage 1850, method 1800 may proceed to stage 1855 where computing device 1900 may receive, using the communication device, an updated second user profile data from the second user device.

After computing device 1900 receives updated second user profile data in stage 1855, method 1800 may proceed to stage 1860 where computing device 1900 may transmit, using the communication device, an update notification to the first user device, wherein the update notification comprises the updated second user profile data.

After computing device 1900 transmits update notification in stage 1860, method 1800 may proceed to stage 1865 where computing device 1900 may receive, using the communication device, an update acceptance selection from the first user device, wherein the update acceptance selection represents acceptance of the first user to accept the updated second user profile data to be associated with the first user account.

After computing device 1900 receives update acceptance selection in stage 1865, method 1800 may proceed to stage 1870 where computing device 1900 may store, using the storage device, the updated second user profile data based on the update acceptance selection. In some embodiments, acceptance may be rules-based and automated. For example, a user of platform 100 may be configured to set parameters for auto-accepting modifications. The parameters for auto-accepting the modifications may be specified by a user profile.

After computing device 1900 stores the updated second user profile data in stage 1870, method 1800 may proceed to stage 1875 where computing device 1900 may receive, using the communication device, a modified second user profile data from the first user device.

After computing device 1900 receives modified second user profile data in stage 1875, method 1800 may proceed to stage 1880 where computing device 1900 may transmit, using the communication device, a modification notification comprising the modified second user profile data to the second user device. Further, the second presentation device is configured for presenting the modification notification to the second user.

After computing device 1900 transmits modification notification in stage 1880, method 1800 may proceed to stage 1885 where computing device 1900 may receive, using the communication device, a modification acceptance selection from the second user device corresponding to the modification notification, wherein the second input device is configured for receiving the modification acceptance selection from the second user.

After computing device 1900 receives modification acceptance selection in stage 1885, method 1800 may proceed to stage 1890 where computing device 1900 may store, using the storage device, the modified second user profile data in association with the first user account based on the modification acceptance selection.

Once computing device 1900 stores the modified second user profile data in association with the first user account based on the modification acceptance selection in stage 1890, method 1800 may then end at stage 1895.

IV. Computing Device Architecture

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 1100-1800 has been described to be performed by a computing device 1900, it should be understood that, in some embodiments, different operations may be performed by different networked elements in operative communication with computing device 1900.

Embodiments of the present disclosure may comprise a system having a memory storage and a processing unit. The processing unit coupled to the memory storage, wherein the processing unit is configured to perform the stages of methods 1100-1800.

Figure 19:
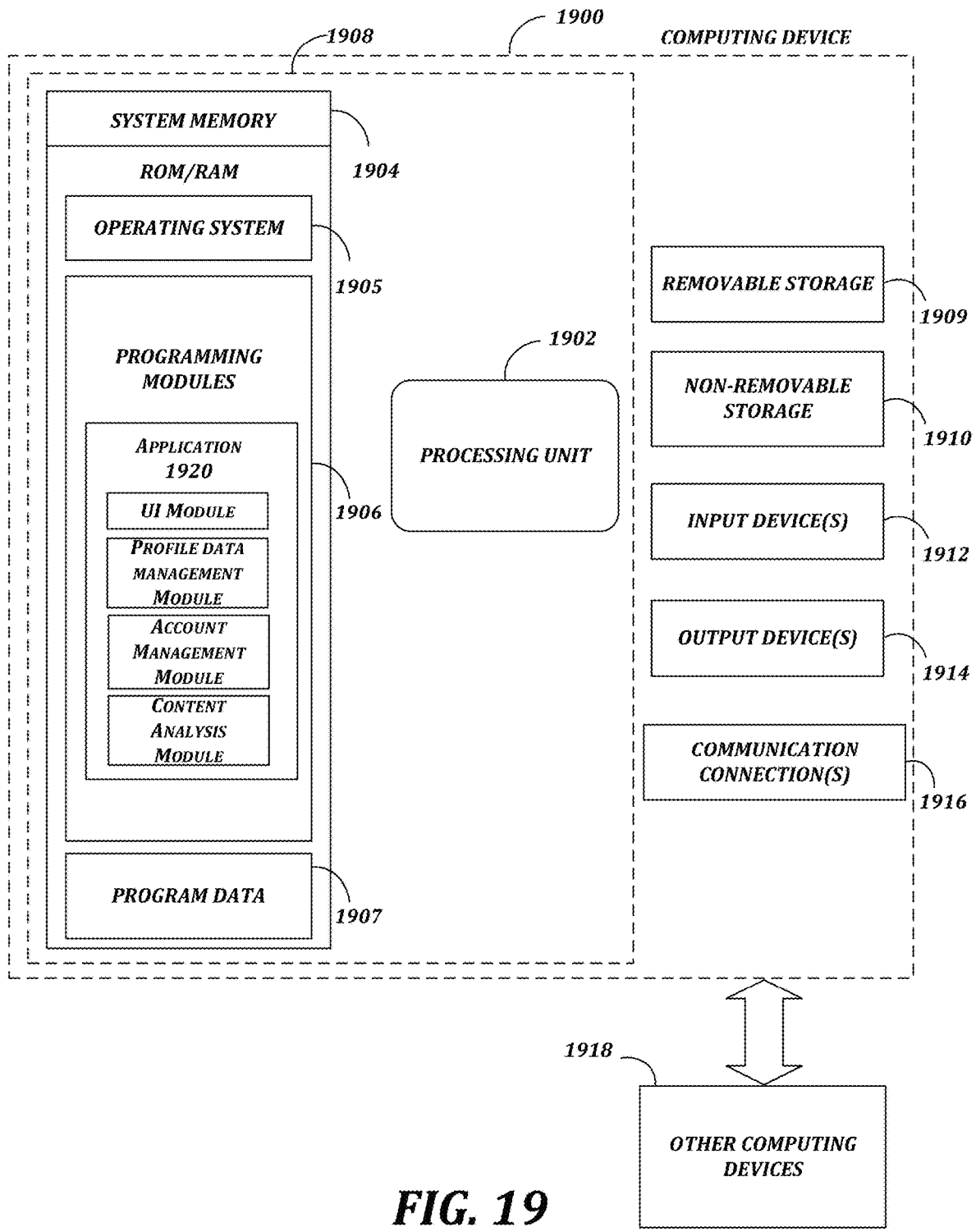
FIG. 19 is a block diagram of a system including a computing device for performing the methods of FIGS. 11-18.

FIG. 19 is a block diagram of a system including computing device 1900. Consistent with an embodiment of the disclosure, the aforementioned memory storage and processing unit may be implemented in a computing device, such as computing device 1900 of FIG. 19. Any suitable combination of hardware, software, or firmware may be used to implement the memory storage and processing unit. For example, the memory storage and processing unit may be implemented with computing device 1900 or any of other computing devices 1918, in combination with computing device 1900. The aforementioned system, device, and processors are examples and other systems, devices, and processors may comprise the aforementioned memory storage and processing unit, consistent with embodiments of the disclosure.

With reference to FIG. 19, a system consistent with an embodiment of the disclosure may include a computing device, such as computing device 1900. In a basic configuration, computing device 1900 may include at least one processing unit 1902 and a system memory 1904. Depending on the configuration and type of computing device, system memory 1904 may comprise, but is not limited to, volatile (e.g. random access memory (RAM)), nonvolatile (e.g. read-only memory (ROM)), flash memory, or any combination. System memory 1904 may include operating system 1905, one or more programming modules 1906, and may include a program data 1907. Operating system 1905, for example, may be suitable for controlling computing device 1900's operation. In one embodiment, programming modules 1906 may include an account management module, a user profile data management module, a version management module, a notification module, a user interface module, a sharing policy module, an interest policy module, an auto-update policy module, a content analysis module and a requirement matching module. Furthermore, embodiments of the disclosure may be practiced in conjunction with a graphics library, other operating systems, or any other application program and is not limited to any particular application or system. This basic configuration is illustrated in FIG. 19 by those components within a dashed line 1908.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910. Computer storage media may include volatile and nonvolatile, removable and non-removable media implemented in any method or technology for storage of information, such as computer readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1900. Any such computer storage media may be part of device 1900. Computing device 1900 may also have input device(s) 1912 such as a keyboard, a mouse, a pen, a sound input device, a touch input device, etc. Output device(s) 1914 such as a display, speakers, a printer, etc. may also be included. The aforementioned devices are examples and others may be used.

Computing device 1900 may also contain a communication connection 1916 that may allow device 1900 to communicate with other computing devices 1918, such as over a network in a distributed computing environment, for example, an intranet or the Internet. Communication connection 1916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1904, including operating system 1905. While executing on processing unit 1902, programming modules 1906 (e.g., software application 1920) may perform processes including, for example, one or more stages of methods 1100-1800 as described above. The aforementioned process is an example, and processing unit 1902 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method of distributing profile data between connected users, the method comprising:

transmitting, using a processing unit on a first user device, a first account indicator associated with a first user account of a first user to a second user device associated with a second user account of a second user, wherein the first user account comprises one or more user profiles associated with the first user account and the second user account comprises one or more user profiles associated with the second user account;

receiving, using the processing unit, a first indication from the second user device corresponding to an account selection associated with the transmitted first account indicator from the first user device;

generating an account connection between the first user device and the second user device in response to receiving the account selection from the second user device, wherein generating the account connection between the first user device and the second user device comprises:
  creating a copy of second user profile data associated with the second user; and
  associating the copy of the second user profile data with the first user account based on the received first indication, transmitting, using the processing unit, the copy of the second user profile data to the first user device;

generating an interface on the first user device based on the copy of the second user profile data;

modifying the copy of the second user profile data using the generated interface, wherein modifying the copy of the second user profile data comprises:
  adding supplemental data using the interface on the first user device, wherein adding the supplemental data comprises at least one of the following:
    adding personal profile data,
    adding social profile data,
    adding educational profile data, and
    adding work profile data;

receiving, using the processing unit, the modified second user profile data from the first user device,
  wherein receiving the modified second user profile data provides an indication of the first user device modifying the copy of the second user profile data, storing, using a memory storage, the account connection;
storing, using the memory storage, the copy of the second user profile data;
storing, using the memory storage, the modified second user profile data in association with the first user account; and
storing a plurality of versions of the second user profile data, the plurality of versions of the second user profile data comprising:
  the second user profile data, and
  the modified second user profile data.

2. The method of claim 1 further comprising:

receiving, using the processing unit, at least one of a rejection selection, and an acceptance selection from the first user device, wherein the rejection selection represents rejection of the first user to accept the second user profile data to be associated with the first user account, and wherein the acceptance selection represents acceptance of the first user to accept the second user profile data to be associated with the first user account, wherein the storing of the copy of the second user profile data is based on the acceptance selection, wherein the copy of the second user profile data associated with the first user account allows a modification of the second user profile data by the first user.

3. The method of claim 1 further comprising:
receiving, using the processing unit, an updated second user profile data from the second user device;
transmitting, using the processing unit, the update notification to the first user device, wherein the update notification comprises the updated second user profile data, wherein the update notification further comprises an update acceptance selection;
receiving, using the processing unit, the update acceptance selection from the first user device, wherein the update acceptance selection represents acceptance of the first user to accept the updated second user profile data to be associated with the first user account; and
storing, using the memory storage, the updated second user profile data based on the update acceptance selection.

4. The method of claim 1 further comprising:
receiving, using the processing unit, a sharing policy data from the second user device, wherein the second user device is configured for receiving the sharing policy data from the second user;
analyzing, using the processing unit, each of the sharing policy data and the second user profile data; and
transmitting, using the processing unit, a curated version of the second user profile data to the first user device based on the analyzing.

5. The method of claim 4, wherein the sharing policy data comprises at least one permission indicator associated with at least one data item, wherein the method further comprises determining, using the processing unit, at least one of at least one shareable data item and at least one non-shareable data item based on the at least one permission indicator, wherein the second user profile data comprises a plurality of data items comprising the at least one shareable data item and the at least one non-shareable data item, wherein the transmitting of the curated version of the second user profile data comprises transmitting the at least one shareable data item.

6. The method of claim 1 further comprising receiving, using the processing unit, an auto-update policy data from the first user device, wherein the auto-update policy data comprises indication of at least one condition under which an updated second user profile data is automatically accepted to be associated with the first user account;
analyzing, using the processing unit, the updated second user profile data in relation to the auto-update policy data; and
automatically associating, using the processing unit, the updated second user profile data with the first user account based on the analyzing of the updated second user profile data.

7. The method of claim 1 further comprising:
analyzing, using the processing unit, an updated second user profile data and the second user profile data; and
generating, using the processing unit, an update notification based on the analyzing, wherein the update notification comprises an update summary,
wherein the update summary displays the updated second user profile data and the second user profile data.

8. The method of claim 1 further comprising:
receiving, using the processing unit, a requirement data comprising at least one desired user characteristic corresponding to at least one desired second user account;
analyzing, using the processing unit, a plurality of second user profile data of a plurality of second user accounts;
identifying, using the processing unit, a plurality of second user characteristics corresponding to the plurality of second user accounts based on the analyzing;
comparing, using the processing unit, the at least one desired user characteristic with the plurality of second user characteristics; and
identifying, using the processing unit, the at least one desired second user account based on the comparing, wherein the processing unit is further configured for transmitting indication of the at least one desired second user account to the first user device, wherein a first presentation device is configured for presenting the indication of the at least one desired second user account to the first user.

9. The method of claim 1 further comprising:
transmitting, using the processing unit, a modification notification comprising the modified second user profile data to the second user device, wherein a second presentation device is configured for presenting the modification notification to the second user; and
receiving, using the processing unit, a modification acceptance selection from the second user device corresponding to the modification notification, wherein the second user device is configured for receiving the modification acceptance selection from the second user, wherein the storing of the modified second user profile data in association with the first user account is based on the modification acceptance selection.

10. A method of facilitating sharing of data between users, the method comprising:
transmitting, using a processing unit on a first user device, a first account indicator associated with a first user account of a first user to a second user device associated with a second user account of a second user, wherein the first user account comprises a plurality of user profiles associated with the first user account and the second user account comprises a plurality of user profiles associated with the second user account;
receiving, using the processing unit, a first indication from the second user device corresponding to an account selection associated with the transmitted first account indicator from the first user device;
creating, using the processing unit, an account connection between the first user account and the second user account based on the first user account selection;
storing, using a memory storage, the account connection;
receiving, using the processing unit, a second user profile data associated with the second user account based on the account connection;
transmitting, using the processing unit, the second user profile data to the first user device;
receiving, using the processing unit, an acceptance selection from the first user device, wherein the acceptance selection represents acceptance of the first user to accept the second user profile data to be associated with the first user account;
associating, using the processing unit, a copy of the second user profile data with the first user account;
storing, using the memory storage, the copy of the second user profile data;
receiving, using the processing unit, an updated second user profile data from the second user device;

transmitting, using the processing unit, an update notification to the first user device, wherein the update notification comprises the updated second user profile data;
receiving, using the processing unit, an update acceptance selection from the first user device, wherein the update acceptance selection represents acceptance of the first user to accept the updated second user profile data to be associated with the first user account;
storing, using the memory storage, the updated second user profile data based on the update acceptance selection, wherein the update notification further comprises the update acceptance selection;
receiving, using the processing unit, a modified second user profile data from the first user device,
wherein receiving the modified second user profile data serves as an indication of the first user device modifying the copy of the second user profile data,
wherein receiving the modified second user profile data comprises the following:
creating additional data, by the first user device, for the copy of the second user profile data, and
inputting the additional data, by the first user device, to the copy of the second user profile data, the additional data comprising at least one of the following:
personal profile data,
social profile data,
educational profile data, and
work profile data; and
transmitting, using the processing unit, a modification notification comprising the modified second user profile data to the second user device, wherein a second presentation device is configured for presenting the modification notification to the second user;
receiving, using the processing unit, a modification acceptance selection from the second user device corresponding to the modification notification, wherein the second user device is configured for receiving the modification acceptance selection from the second user;
storing, using the memory storage, the modified second user profile data in association with the first user account based on the modification acceptance selection; and
storing a plurality of versions of the second user profile data, the plurality of versions of the second user profile data comprising:
the second user profile data, and
the modified second user profile data.

11. A system for distributing profile data between connected users, the system comprising:
a processing unit coupled to a memory storage, the processing unit configured to:
transmit, from a first device associated with a first user, a first account indicator associated with a first user account, to a second device associated with a second user account, wherein the second user account corresponds to a second user,
wherein the first user account comprises a plurality of user profiles associated with the first user account and the second user account comprises a plurality of user profiles associated with the second user account,
receive a first indication, from the second device, the first indication corresponding to an account selection associated with the transmitted first account indicator from the first device,
generate an account connection between the first device and the second device in response to the received first indication, wherein generating the account connection comprises:
creating a copy of second user profile data associated with the second user; and
associating the copy of the second user profile data with the first user account based on the received first indication,
transmit the copy of the second user profile data to the first user device,
generate an interface on the first user device, the interface being configured to enable the first user to modify the copy of the second user profile data,
receive, from the interface on the first user device, a modified second user profile,
wherein the received modified second user profile provides an indication that the first user device modified the copy of the second user profile data, and
wherein the modified second user profile data comprises:
supplemental data received from the first user device associated with the second user profile the supplemental data comprising at least one of the following:
personal profile data,
social profile data,
educational profile data, and
work profile data;
the memory storage communicatively coupled with the processing unit, wherein the memory storage is configured to:
store the second user profile data associated with the second user account,
store the account connection,
store the copy of the second user profile data associated with the second user account, and
store the modified second user profile data in association with the first user account, and
store a plurality of versions of the second user profile data.

12. The system of claim 11, wherein the processing unit is further configured to receive at least one of a rejection selection, and an acceptance selection from the first user device, wherein the rejection selection represents rejection of the first user to accept the second user profile data to be associated with the first user account, and wherein the acceptance selection represents acceptance of the first user to accept the second user profile data to be associated with the first user account, wherein the memory storage is configured for storing the copy of the second user profile data based on the acceptance selection, wherein the copy of the second user profile data associated with the first user account allows an input of additional data to the second user profile data by the first user.

13. The system of claim 12, wherein the processing unit is further configured to:
receive an updated second user profile data from the second user device;
transmit an update notification to the first user device, wherein the update notification comprises the updated second user profile data, wherein the update notification further comprises an update acceptance selection; and receive the update acceptance selection from the first user device, wherein the update acceptance selection represents acceptance of the first user to accept the updated second user profile data to be associated with the first user account, wherein the memory storage is further configured for storing the updated second user profile data based on the update acceptance selection.

14. The system of claim 11, wherein the processing unit is further configured to receive a sharing policy data from the second user device, wherein the processing unit is configured for analyzing each of the sharing policy data and the second user profile data, wherein the processing unit is further configured for transmitting a curated version of the second user profile data to the first user device based on the analyzing.

15. The system of claim 14, wherein the sharing policy data comprises at least one permission indicator associated with at least one data item, wherein the processing unit is configured for determining at least one of at least one shareable data item and at least one non-shareable data item based on the at least one permission indicator, wherein the second user profile data comprises a plurality of data items comprising the at least one shareable data item and the at least one non-shareable data item, wherein the transmitting of the curated version of the second user profile data comprises transmitting the at least one shareable data item.

16. The system of claim 11, wherein the processing unit is further configured for receiving an auto-update policy data from the first user device, wherein the auto-update policy data comprises an indication of at least one condition under which an updated second user profile data is automatically accepted to be associated with the first user account, wherein the processing unit is further configured to perform the following:

analyze the updated second user profile data in relation to the auto-update policy data; and associate the updated second user profile data with the first user account based on the analyzing of the updated second user profile data.

17. The system of claim 13, wherein the processing unit is further configured to perform the following:

analyze the updated second user profile data and the second user profile data; and generate an update summary based on the analyzing, wherein the update notification comprises the update summary, wherein the update summary displays the updated second user profile data and the second user profile data.

18. The system of claim 11, wherein the processing unit is further configured for receiving a requirement data comprising at least one desired user characteristic corresponding to at least one desired second user account, wherein the processing unit is further configured for:

analyze a plurality of second user profile data of a plurality of second user accounts;

identify a plurality of second user characteristics corresponding to the plurality of second user accounts based on the analyzing;

compare the at least one desired user characteristic with the plurality of second user characteristics; and identify the at least one desired second user account based on the comparing, wherein the processing unit is further configured for transmitting the indication of the at least one desired second user account to the first user device.

19. The system of claim 11, wherein the processing unit is configured to perform the following:

transmit a modification notification comprising the modified second user profile data to the second user device; and receive a modification acceptance selection from the second user device corresponding to the modification notification, wherein the processing unit is configured to, upon the modification acceptance selection, modify the second user profile data of the second user device associated with the second user in accordance with the modified second user profile data of the second user associated with the first user account, wherein the memory storage is configured for storing the modified second user profile data in association with the second user account based on the modification acceptance selection.

20. The system of claim 11, wherein the processing unit is further configured to receive an interest indicator from the first user device associated with the first user account of the first user, wherein the interest indicator comprises:

an interest policy data representing one or more of a relevant data item and an irrelevant data item, and a consent indicator representing consent of the first user device to receive digital content associated with the second user, wherein the transmitting of the first account indicator to the first user device is based on the interest indicator.

* * * * *